United States Patent
Roumeli et al.

(10) Patent No.: US 12,448,517 B2
(45) Date of Patent: *Oct. 21, 2025

(54) BIOCOMPOSITE MATERIALS AND RELATED COMPOSITIONS, METHODS AND SYSTEMS

(71) Applicant: CALIFORNIA INSTITUTE OF TECHNOLOGY, Pasadena, CA (US)

(72) Inventors: Eleftheria Roumeli, Pasadena, CA (US); Luca Bonanomi, Pasadena, CA (US); Chiara Daraio, Pasadena, CA (US); Rodinde Hendrickx, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 18/475,639

(22) Filed: Sep. 27, 2023

(65) Prior Publication Data
US 2024/0018359 A1    Jan. 18, 2024

Related U.S. Application Data

(63) Continuation of application No. 16/911,269, filed on Jun. 24, 2020, now Pat. No. 11,807,760.

(60) Provisional application No. 62/865,506, filed on Jun. 24, 2019.

(51) Int. Cl.
| | | |
|---|---|---|
| C08L 97/02 | (2006.01) | |
| C08L 5/04 | (2006.01) | |
| C08L 5/06 | (2006.01) | |
| C08L 5/14 | (2006.01) | |
| C08L 101/16 | (2006.01) | |

(52) U.S. Cl.
CPC ............... *C08L 97/02* (2013.01); *C08L 5/04* (2013.01); *C08L 5/06* (2013.01); *C08L 5/14* (2013.01); *C08L 101/16* (2013.01); *C08L 2201/06* (2013.01)

(58) Field of Classification Search
CPC .... C08L 97/02; C08L 5/04; C08L 5/06; C08L 5/14; C08L 101/16; C08L 2201/06
See application file for complete search history.

(56) References Cited

U.S. PATENT DOCUMENTS

| | | |
|---|---|---|
| 11,807,760 B2 | 11/2023 | Roumeli et al. |
| 2020/0399474 A1 | 12/2020 | Roumeli et al. |

OTHER PUBLICATIONS

Non-Final Office Action issued for U.S. Appl. No. 16/911,269, filed Jun. 24, 2020, on behalf of California Institute of Technology. Mail Date: Mar. 15, 2023. 10 Pages.
Notice of Allowance issued for U.S. Appl. No. 16/911,269, filed Jun. 24, 2020, on behalf of California Institute of Technology. Mail Date: Jul. 12, 2023. 7 Pages.
Restriction Requirement issued for U.S. Appl. No. 16/911,269, filed Jun. 24, 2020, on behalf of California Institute of Technology. Mail Date: Aug. 19, 2022. 6 Pages.
Certification Statement and List—37 CFR 1.98(d)(1) filed in U.S. Appl. No. 18/475,639, filed Sep. 27, 2023 on behalf of California Institute of Technology. 1 page.
U.S. Appl. No. 16/911,269, filed Jun. 24, 2020, US 20200399474A1, Dec. 24, 2020, U.S. Pat. No. 11,807,760, Nov. 7, 2023, California Institute of Technology, Eleftheria Roumeli, Luca Bonanomi, Chiara Daraio, and Rodinde Hendrickx.

*Primary Examiner* — Angela C Scott
(74) *Attorney, Agent, or Firm* — Steinfl + Bruno LLP

(57) ABSTRACT

Biocomposites and related fabrication methods and systems are described, the biocomposites comprising compacted plants and/or algae cells having a water content of less than 15 wt %, and a minimized pore presence and/or dimensions, in which the compacted cells are in a lamellar stacked configuration with a plurality of lamellae arranged one above the other, each lamella independently having a thickness of 20 nm to 5 μm and comprising a semi-crystalline structure formed by biopolymers of cell walls of the compacted plant and/or algae cells.

27 Claims, 19 Drawing Sheets

D

BIOCOMPOSITE MATERIALS AND RELATED COMPOSITIONS, METHODS AND SYSTEMS

CROSS REFERENCE TO RELATED APPLICATIONS

The present application is a continuation of U.S. patent application Ser. No. 16/911,269 filed on Jun. 24, 2020, incorporated herein by reference, which, in turn, claims priority to U.S. Provisional Application No. 62/865,506 entitled "Bio-Composite Materials From Plant Cells, Algae, And Agriculture Waste" filed Jun. 24, 2019, which is incorporated herein by reference in its entirety.

FIELD

The present disclosure relates to a biocomposite material and related, compositions, devices, methods and systems. In particular, the present disclosure relates to materials combinations and methods to produce a novel class of biocomposites from a sustainable source including plant cells, algae, and agricultural waste.

BACKGROUND

The emerging need for materials that are sustainable from an environmental point of view has led to the introduction of biological polymers and fibers in composites to limit the amount of non-degradable components and reduce their impact on the environment.

Despite the most recent efforts to in providing on new sustainable materials has focused on utilizing fibers and fillers from sustainable and renewable resources as reinforcements, introducing recycled and waste coproducts, and developing materials with desirable physical and mechanical properties from an environmentally sustainable source remains challenging.

SUMMARY

Described herein is a fabrication method and related biocomposites compositions, methods, and systems comprising cultured plant and/or algae cells that in several embodiments provide environmentally sustainable materials further possessing unexpectedly mechanical and other physical properties comparable or superior to existing biocomposite and fossil based materials.

According to a first aspect, a biocomposite is described comprising compacted plant and/or algae cells in a lamellar stacked configuration with a plurality of lamellae arranged one above the other, each lamella independently having a thickness of 20 nm to 5 µm.

In each lamella of the biocomposite of the disclosure compacted cells walls of the plant and/or algae cells form a semicrystalline structure having a crystalline component of glucose-based biopolymers within an amorphous matrix of sugar-based biopolymers and/or phenol-based biopolymers of cell walls of the compacted plant and/or algae cells. In the biocomposite, the compacted plant and/or algae cells have a water content of less than 15 wt %. In the biocomposite, the compacted plant and/or algae cells are poreless or have pores with a diameter of less than 10 µm.

According to a second aspect, a biocomposite fabrication method is described for providing a biocomposite according to the present disclosure and a biocomposite obtained thereby.

The method comprises: compacting along a plane a cultured biomass comprising cultured plant and/or algae cells from a suspension culture, the cultured plant and/or algae cells having a water content of at least 10 wt %, and a turgor pressure, In the method the compacting is performed by continuously applying to the cultured biomass an increasing pressure perpendicular to the plane until reaching an applied pressure corresponding to the turgor pressure of the cultured plant and/or algae cells to provide a compressed biomass.

In the fabrication method the compacting further comprises drying the compressed biomass by one or both of
  a) applying a drying pressure to the compacted biomass and/or
  b) applying a drying temperature to the compressed biomass to obtain a biocomposite material having water content of 0.1-15 wt %, a mass loss of 80-99% and/or a dry density of 500-1500 kg/m$^3$.

According to a third aspect, a biocomposite fabrication system is described, comprising a cultured biomass comprising cultured plant and/or algae cells from a suspension culture having a water content of at least 10 wt %, and a compression tool.

In the system, the biomass comprises cultured plant and/or algae cells and the compression tool is configured to interact with the cultured biomass in accordance with the fabrication method herein described to provide a biocomposite material having water content of 0.1-15 wt %, a mass loss from the cultured biomass of 80-99 wt % and/or a dry density of 500-1500 kg/m$^3$.

The biocomposites and related materials, compositions, methods and systems herein described, allows in several embodiments to provide materials from sustainable and renewable resources such as recycled and waste bioproducts, and having a flexural modulus ranging from 0.1 to 7 GPa, modulus of rupture 5-95 MPa, Young's modulus 1.5-5 GPa, tensile strength ranging from 9 to 35 MPa, and/or compressive modulus 0.04-1.5 GPa.

The biocomposites and related materials, compositions, methods and systems herein described, allows in several embodiments to produce biocomposite from renewable (naturally replenished with time) and/or sustainable (which can be maintained for a definable period of time) biological resources with mechanical properties similar or superior to existing material from the biological sources.

The biocomposites and related materials, compositions, methods and systems herein described, allow in several embodiments to provide biocomposites with a controllable longevity of material to be optionally enhanced by such as application of a polymer coating to a biocomposite material herein described.

The biocomposites and related materials, compositions, methods and systems herein described, allows in several embodiments to provide biocomposites that can be used as construction materials with a positive environmental impact by generating large quantities of the material, from renewable sources such as recycled and waste bioproducts.

The biocomposites and related materials, compositions, methods and systems herein described, allows in several embodiments to provide biocomposites without need for treatment with a chemical (e.g. solvent/acid/base) treatment and/or addition of adhesives.

The biocomposites and related materials, compositions, methods and systems herein described, can be used in connection with any applications wherein an environmentally sustainable material having mechanical properties comparable or superior to existing fossil-based material is desired. Exemplary applications comprise materials for construction and/or insulation, (such as panels and bricks), as well as various types of packaging material including single use packaging material (e.g. food containers, make up containers), multi-use packaging material, such as plastic and wood alternative (e.g. plastic cafeteria trays, furniture, clothes hangers), small scale packaging (e.g. small volume, small production batches), packaging material not requiring waterproof properties, waterproof material materials, and additional identifiable by a skilled person. Additional uses and application applications are also identifiable by a skilled person.

The details of one or more embodiments of the disclosure are set forth in the accompanying drawings and the description below. Other features, objects, and advantages will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

Figure 1:
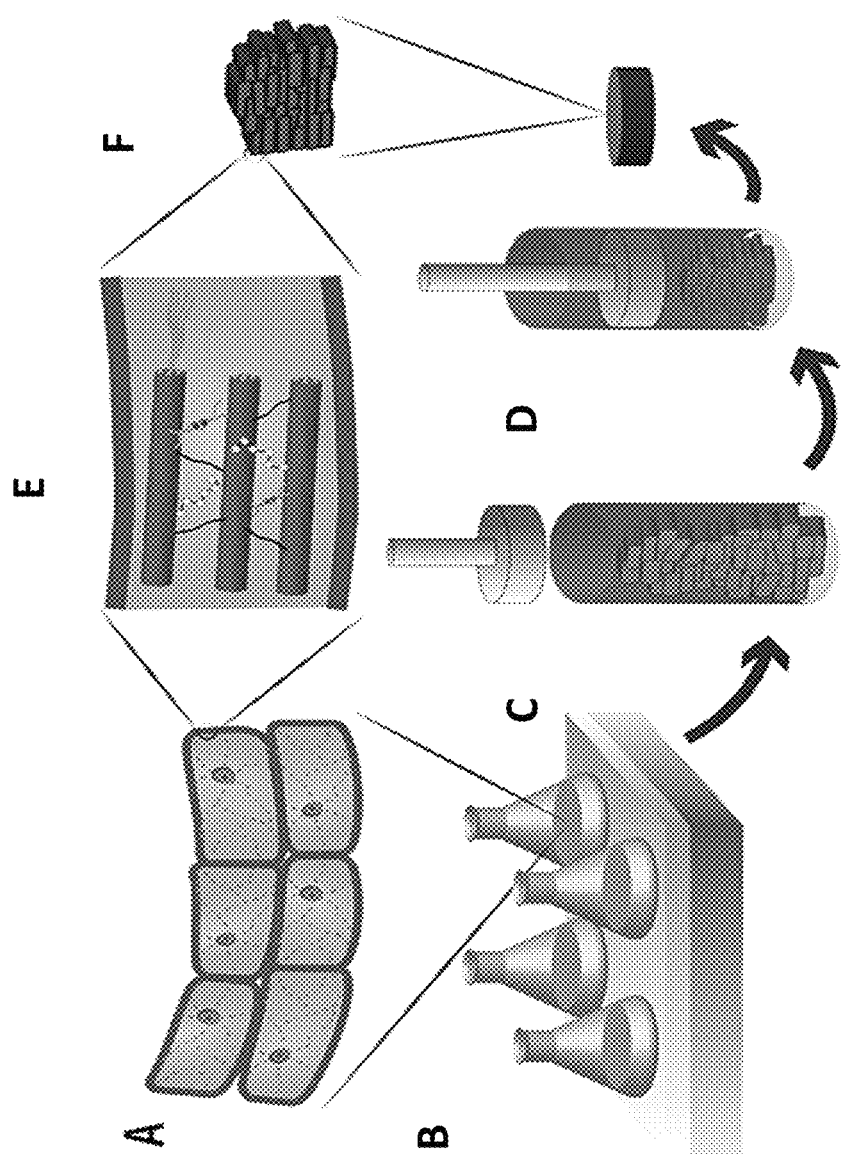
FIG. 1 shows schematic of an exemplary fabrication method according to the disclosure. Plant and/or algae cells (Panel A) are cultured (Panel B), harvested (Panel C) and subjected to a controlled compression (Panel D) and dehydration, resulting in the plant cell walls (Panel E) providing a lamellar architecture when dried (Panel F).

Described herein is a biocomposite and the related compositions, methods, and systems based on cultured plant cells.

The term "composite" or "composite material" as used herein indicates a material made from two or more constituent materials with significantly different physical or chemical properties that, when combined, produce a material with characteristics different from the individual components. In a composite material, the individual components remain separate and distinct within the finished structure, differentiating composites from mixtures and solid solutions. Exemplary composite materials with a polymer main component (also called matrix) are found in the 2 provided references, mixed with different types of filler additives. (A. C. Balazs, T. Emrick and T. P. Russell, 2006; Kinloch et al., 2018). They combine high specific mechanical properties at low densities with processability, making them essential in widespread applications, from automotive to sports goods and robotics.

The term "biocomposite" as used herein indicates a composite material in which the two or more constituent materials with significantly different physical or chemical properties of biological origin (herein also biomaterials). Typically the two materials comprise a rigid biomaterial in an matrix. The rigid biomaterial can be of various biological origins and in particular can be derived from plants, such as fibers from crops (e.g. cotton, flax or hemp), recycled wood, waste paper, crop processing byproducts or regenerated cellulose fiber (e.g. viscose/rayon). In biocomposites, the rigid biomaterial and its configuration are typically mainly responsible for the mechanical properties of the biocomposite while the matrix typically protects the rigid biomaterial from environmental degradation and mechanical damage, and holds the rigid biomaterial together and to transfer the loads on it.

Exemplary biocomposite in the sense of the disclosure can be formed living matter, at an organism or cellular level, to serve as the main component, or assemble the main component such as the biocomposite reviewed and classified as Engineering Living Materials, ELM (Nguyen et al., 2018). Within ELM, composites created from living organisms and synthetic nanomaterials, can give rise to another sub-category, nanobionics or bionicomposites, described e.g. in Pugno and Valentini, 2019. L. Valentini et al., 2016; Luca Valentini et al., 2016, Di Giacomo, Maresca, Angelillo, et al., 2013; Di Giacomo, Maresca, Porta, et al., 2013; Di Giacomo, Daraio and Maresca, 2015 Haneef et al., 2017. Living organism that can form biocomposite includes for example bacteria and more complex living organisms, such as fungi, algae and fermenting yeast and eukaryotic biological growth for production possibly as part of "self-growing" composites. The option of adding synthetic nanoparticles in the growth medium allows added properties in the final composite, such as catalytic, electronic and sensing (Bigall et al., 2008) or to create hybrid panel composites of wood, fungal mycelium, and cellulose nanofibrils (CNF) with improved mechanical properties, compared to all-mycelium materials (Sun et al., 2019).

Biocomposites according to the present disclosure comprise plants and/or algae cell, which are compacted to form a biocomposite comprising rigid biopolymers and an amorphous matrix of biopolymers from the plant and/or algae cell wall. The term "cell" as used herein indicates the basic structural, functional, and biological unit of all known organisms. Cells are of two types: eukaryotic, which contain a nucleus, and prokaryotic, which do not. Most cells are only visible under a microscope, with dimensions between 1 and 150 micrometers. Cells consist of cytoplasm enclosed within a membrane, which contains many biomolecules such as proteins and nucleic acids.

The cell membrane is typically formed by a lipid bilayer or monolayer, including cholesterols (a lipid component) that sit between phospholipids to maintain their fluidity at various temperatures. The cell membrane typically also contains membrane proteins, including integral proteins that go across the membrane serving as membrane transporters, and peripheral proteins that loosely attach to the outer (peripheral) side of the cell membrane, acting as enzymes shaping the cell.

The term "cytoplasm" or "cytoplasmic material" as used herein indicates all of the material within a cell, enclosed by the cell membrane, including the nucleoplasm (cellular material inside the nucleus and contained within the nuclear membrane). The main components of the cytoplasm are cytosol, a gel-like substance, the organelles—the cell's internal sub-structures, and various cytoplasmic inclusions. The cytoplasm is about 80% water and usually colorless.

Cells in the sense of the disclosure typically comprise organelles. An "organelle" in the sense of the disclosure indicates a specialized subunit, usually within a cell, that has a specific function. Organelles are either separately enclosed within their own lipid bilayers (also called membrane-bound organelles) or are spatially distinct functional units without a surrounding lipid bilayer (non-membrane bound organelles).

The term "plant and/or algae cell" as used herein indicates a eukaryotic cell comprising at least a primary cell wall and possibly a secondary cell wall, such as eukaryotic cells of a eukaryote organism of the kingdom Plantae and eukaryotic cells of any eukaryote organism of the taxon Algae.

Plant and/or algae cells' distinctive features in the sense of the disclosure comprises presence of i) a primary cell walls, ii) a cell membrane, iii) internal organelles comprised within iv) cytoplasmic material. Internal organelles of plant cells in the sense of the disclosure comprise, the nucleus, a plastids, with the capability to perform photosynthesis, a vacuole that regulates turgor pressure mitochondrion, golgi apparatus and additional organelles identifiable by a skilled person.

A "cell wall" in the sense of the disclosure indicates a structural layer surrounding some types of cells, just outside the cell membrane. A cell wall provides the cell with both structural support and protection, and also acts as a filtering mechanism A cell wall has mechanical properties depending on the related composition and configuration. A cell wall major function is to act as pressure vessels, preventing over-expansion of the cell when water enters.

In a "plant and/or algae cell" according to the instant disclosure, a cell wall of the plant and/or algae cell is a composite which comprises primarily a combination of glucose based biopolymers such as polysaccharides and glycoproteins, which provide a rigid component of the cell wall as well as sugar-based biopolymers and/or phenol based biopolymers such as hemicellulose and/or pectin and/or a combination of alginate carrageenan, starch and/or agar which provide the matrix component of the cell wall.

As used herein, a "sugar-based biopolymer" refers to a natural polymer that can be produced by a living organism or cell and that contains at least three monosaccharide monomeric moieties. Exemplary monosaccharide monomers include D-glucose units, D-mannopyranuronose, L-gulopyranuronose, and L-gulopyranuronic acid. Sugar-based biopolymer in which the at least three monosaccharide monomeric moieties are D-glucose units are indicated identified as "glucose based." Exemplary biopolymer of D-glucose units include cellulose. Exemplary biopolymer of D-mannuronic acid, and L-guluronic acid includes alginic acid Additional, exemplary sugar-based biopolymer in cell wall of a plant and/or algae cell comprises glycoproteins, polysaccharides, starches an additional biopolymers identifiable by a skilled person.

As used herein, a phenol-based biopolymer refers to a natural polymer that can be produced by a living organism or cell and that contains at least three phenolic or substituted phenolic monomeric moieties. Exemplary phenolic or substituted phenolic monomers include paracoumaryl alcohol, coniferyl alcohol and sinapyl alcohol.

Plant cell walls are naturally secreted by the protoplast on the outer surface of the plasma membrane of the plant cells. In particular, in a plant cell according to the disclosure the composition of cell walls varies between species and may depend on cell type and developmental stage.

The primary cell wall of photosynthetic eukaryotes of the kingdom Plantae is structured as a composite typically composed of at least the polysaccharides cellulose, hemicelluloses and pectin, in which the cellulose provides a crystalline component and the hemicelluloses and pectin are comprised in an amorphous matrix. In particular, primary cell wall of photosynthetic eukaryotes of the kingdom Plantae primarily consists of four building blocks, cellulose, hemicellulose, pectin and possibly lignin in Plantae, at varying concentrations and spatial organization depending on the plant species, the cell's stage of development and function they serve. In those plant cells Cellulose is the main load bearing component of the cell wall of photosynthetic eukaryotes of the kingdom Plantae and is organized into semi-crystalline microfibrils with excellent mechanical properties, with Young's modulus up to 220 GPa, and tensile strength up to 7.7 GPa, depending on crystallinity and physical characteristics (16). In the cell wall of photosynthetic eukaryotes of the kingdom Plantae, cellulose microfibrils are immersed in a matrix of amorphous polysaccharides, hemicelluloses and pectins (30). Hemicelluloses bind individual cellulose fibrils together, assisting in the load transfer within the cell wall. Pectins form gels around the cellulose-hemicellulose fibrils which allow for sideways fibril slippage and heavily influence the cell wall porosity and thickness (30). Lignin, an amorphous phenolic polymer which is deposited within the carbohydrate matrix of the cell wall in the final stages of cell differentiation, provides structural integrity by enabling load transfer to the cellulose microfibrils, while also providing resistance to external pathogens (53).

Accordingly, in some embodiments of biocomposite of the disclosure and related compositions, methods and systems, plant cell walls of photosynthetic eukaryotes of the kingdom Plantae according to the disclosure are primarily composed of semi-crystalline cellulose microfibrils, which have remarkable mechanical properties (Young's modulus up to 220 GPa, and tensile strength up to 7.7 GPa, depending on crystallinity and physical characteristics (Gibson, 2012)) and are immersed in a complex matrix of amorphous hemicelluloses, lignins and pectins. Model of the structure and functions of plant cell wall components still remains to be refined (Cosgrove, 2005, 2014).

Exemplary plant cells present in a photosynthetic eukaryote of the kingdom Plantae comprises a cell from Chlorokybophyta, Mesostigmatophyta, Spirotaenia, Chlorobionta, Chlorophyta, Streptobionta, Klebsormidiophyceae, Charophyta (stoneworts), Chaetosphaeridiales, Coleochaetophyta, Zygnematophyta, Embryophyta (land plants), Marchantiophyta (liverworts), Bryophyta (mosses), Anthocerotophyta (hornworts), Horneophyta, Aglaophyta, and Tracheophyta (vascular plants).

In particular exemplary trachephyta plant cells comprise plant cells of the *Nicotiana* genus in Solanaceae family, includes *Nicotiana attenuate* (coyote tobacco), *Nicotiana obtusifolia, Nicotiana acuminate, Nicotiana Africana, Nicotiana alata, Nicotiana benthamiana, Nicotiana clevelandii, Nicotiana glauca, Nicotiana glutinosa, Nicotiana langsdorffii, Nicotiana longiflora, Nicotiana occidentalis, Nicotiana otophora, Nicotiana plumbaginifolia, Nicotiana quadrivalvis, Nicotiana rustica, Nicotiana suaveolens, Nicotiana Sylvestris, Nicotiana tabacum*, and *Nicotiana tomentosiformis*.

Exemplary trachephyta plant cells further comprise plant cells of the *Arabidopsis* genus of the Brassicaceae family, comprising *Arabidopsis arenicola, Arabidopsis arenosa* (L.) Lawalrée, *Arabidopsis croatica* (Schott), *Arabidopsis halleri* (L.), *Arabidopsis lyrata* (L), *Arabidopsis neglecta* (Schultes) *Arabidopsis pedemontana* (Boiss.) *Arabidopsis suecica* (Fries) Norrlin, Meddel. And *Arabidopsis thaliana* (L.) Heynh.

In algae cells in accordance with the disclosure the native composition of the of the cell walls is more diverse than in plants and is species-dependent. Cell walls of algae cells are composite in nature having a crystalline component and an amorphous component. In particular cell walls of algae, have glycoproteins and carbohydrates as the main glucose-based components crystalline biopolymer, rigid and of glucosic nature forming a crystalline, which in some instances can be in a fibrous form, (e.g. as cellulose). Cell wall biopolymers of algae form one or more distinct layers (possibly at least 2), identifiable by TEM.

Accordingly, the primary cell wall of photosynthetic eukaryotes of the group Algae is typically composed of glycoproteins and polysaccharides such as alginate, starch carrageenan and agar. Algae cell walls are extremely diverse and have very different arrangements among different species. For example, the cell wall of *Chlamydomonas reinhardtii* is a multilayered extracellular matrix, cellulose-deficient, composed of carbohydrates and 20-25 polypeptides. Other algae also have a multilayered cell wall with several distinct layers (e.g. at least 3 or 5 layers depending on the species), some of which form a highly crystalline lattice comprised of glycoprotein subunits. The outer layer can be fibrous. The red algae possess complex composite cell walls made of cellulose, xylan or mannan fibrils and extensive matrix polysaccharides including the economically important carrageenan and agar.

In some algae cells, the cell wall can be thin (e.g. 30 nm at minimum-), contain no cellulose and be comprised of carbohydrates and several hydroxyproline-rich glycoproteins which are cross-linked to short oligosaccharides. In those algae the crystalline lattice formed from hydroxyproline-rich glycoproteins. The same crystalline component is found for example at least in 15 green algae species belonging to the *Volvocales, Chlorococcales, Codiolales, Desmidiales* and *Zygnematales*, (see references [73] and (74)). In some green algae with different glycoprotein crystalline structures (see reference 75). Another algae's species, *Botryococcus* is composed of a fibrous cell wall layer of uniform thickness (50 nm) In other algae the polysaccharide cell walls comprise agarose (agar) and carrageenan are sulfated galactans (in red seaweeds). In some algae cell wall, the polysaccharide is comprised of the repeating disaccharide 3-β-D-Galp-1-4-3,6-anhydro-α-L-Galp-1 unit. Alginic acid, a linear polysaccharide composed of 1-4-linked β-D-ManA and its C-5 epimer 1-4-linked α-L-GulA, is obtained from various species of brown seaweed. (see: Chapter 24 reference 76))

Exemplary Alga eukaryote organism comprise a cell from Archaeplastida, Plantae/green algae, Mesostigmatophyceae, Chlorokybophyceae, Chlorophyta, Charophyta, Rhodophyta (red algae), Glaucophyta, Rhizaria, Excavata, Chlorarachniophytes, Euglenids, Chromista, Alveolata, Heterokonts, Bacillariophyceae (Diatoms), Axodines, Bolidomonas, Eustigmatophyceae, Phaeophyceae (brown algae), Chrysophyceae (golden algae), Raphidophyceae, Synurophyceae Xanthophyceae (yellow-green algae), Cryptophyta, Dinoflagellata Haptophyta and *Chlamydomonas*.

In particular, exemplary *Chlamydomonas* algae suitable for the biocomposite of the disclosure that can be found in stagnant water and on damp soil, in freshwater, seawater, comprise *Chlamydomonas* includes Species: *C. aalesundensis—C. abbreviata Chlamydomonas acidophila, Chlamydomonas caudata Wille, Chlamydomonas ehrenbergii Gorozhankin, Chlamydomonas elegans Chlamydomonas moewusii, Chlamydomonas nivalis, Chlamydomonas ovoidae and Chlamydomonas reinhardtii.*

In plant cells in accordance with the disclosure the native composition of the plant cell primary and possibly secondary walls, as well as the arrangement of the different components within the cell wall and on the hierarchical organization of the cells at the microscale are the primary responsible for the mechanical properties of any biomaterials based on the plant cells. (Gibson and Ashby, 1997; Gibson, 2012).

In a plant cell according to the disclosure the composition of cell walls varies between species and may depend on cell type and developmental stage. Accordingly, in biocomposites according to the present disclosure, by controlling the native composition of plant cell walls, organization of the main components in the cell walls and varying the cellular microstructure, plants can exhibit this remarkable range of mechanical properties of biomaterials based on plant cells in the sense of the disclosure.

In some embodiments, the biocomposite of the present disclosure comprise a mixture of plant and algae cells from various sources and feedstock biomass, preferably from renewable and/or sustainable sources.

In some embodiments, the biocomposite of the present disclosure comprise only plant cells. from various sources and feedstock biomass, preferably from renewable and/or sustainable sources.

In some embodiments, the biocomposite of the present disclosure comprise only plant cells from various sources and feedstock biomass, preferably from renewable and/or sustainable sources.

A biocomposite according to the disclosure (herein also indicated as "AW" and "BC") comprises compacted plant and/or algae cells having a water content of less than 15 wt %.

In particular in some embodiments of the biocomposite as described herein, the compacted plant and/or algae cells have a water content equal to or less than 12 wt %.

In particular in some embodiments of the biocomposite as described herein, the compacted plant and/or algae cells have a water content equal to or less than 10 wt %.

In particular in some embodiments of the biocomposite as described herein, the compacted plant and/or algae cells have a water content ranging from 6 wt %. to 8 wt %

In some embodiments of the biocomposite as described herein, the compacted plant and/or algae cells have a water content equal to or less than 2.0 wt %.

In some embodiments of the biocomposite as described herein, the compacted plant and/or algae cells have a water content equal to or less than 1.0 wt %.

In some embodiments of the biocomposite as described herein, the compacted plant and/or algae cells have a water content equal to or less than 0.1 wt %.

Accordingly, biocomposite of the instant disclosure can have dry density ranging from 500-1500 kg/m3, in combination with a water content between 0.1-15 wt %.

The term "dry density" as used herein indicates the density of the biocomposite taken in the dry state. The biocomposite mass is commonly a mixture of air, water and compacted plant and/or algae cells solids. The dry density refers to compacted plant and/or algae cells solids. The dry density can be calculated using the expression as below, $$\rho d = Ms/Vt$$

wherein ρd indicates the dry density, Ms is mass of the soil solids and VT is total soil solid volume.

In some embodiments, biocomposite of the instant disclosure can have a dry density ranging from of 900-1100 kg/m$^3$, in particular, when the biocomposite comprises plant cells.

In some embodiments, biocomposite of the instant disclosure can have a dry density ranging from of 900-1000 kg/m$^3$, in particular, when the biocomposite comprises algae cells.

A biocomposite according to the disclosure is further poreless or has pores with a diameter of less than 10 μm.

The term "pore" as described herein indicates a cavity that has a volume equivalent to that of a sphere having diameter of at least 1 nanometer. Accordingly a pore in the sense of the disclosure is a void that remains unfilled with polymers and other components in a composite material. Pores can affect the mechanical properties and lifespan of the composite. They degrade mainly the matrix-dominated properties such as interlaminar shear strength, longitudinal compressive strength, and transverse tensile strength. Pores contribute to the substance's porosity and can be detected through Scanning Electron Microscopy (SEM) imaging, Transmission Electron (TEM) imaging, X-ray tomography and additional methods identifiable by a skilled person. Accordingly, the term as used herein the term "poreless" refers to absence of a cavity that has a volume equivalent to that of a sphere having diameter of at least 1 nanometer as detectable with these detection techniques.

In embodiments of the biocomposite as described herein, the compacted plant and/or algae cells have pores with a diameter of less than 10 μm.

Preferably in embodiments of the biocomposite as described herein, the compacted plant and/or algae cells have pores with a diameter of less than 5 μm.

More preferably in embodiments of the biocomposite as described herein, the compacted plant and/or algae cells have pores with a diameter of less than 3 μm.

Even more preferably in embodiments of the biocomposite as described herein, the compacted plant and/or algae cells have pores with a diameter of less than 2 μm.

Most preferably in embodiments of the biocomposite as described herein, the compacted plant and/or algae cells have pores with a diameter of 1 μm or less.

In biocomposite of the instant disclosure the compacted plant and/or algae cells form lamellae having a thickness of 20 nm to 5 μm.

The term "lamella" as used herein indicates a thin layer of material having a same structural feature. Accordingly, lamellar structures can be fine layers of a same material or alternating and/or in series between different materials in various configuration. For example, a lamellar structure can refer to collections of fine sheets of material held adjacent to one another (e.g. in a gill-shaped structure) or one above the other (a stacked configuration), possibly with fluid in between though sometimes simply a set of 'welded' plates. Lamellae can be produced by chemical effects (as in eutectic solidification), biological means, or a deliberate process of lamination, such as pattern welding. Lamellae can also describe the layers of atoms in the crystal lattice of a material such as a metal.

In biocomposite of the instant disclosure, each lamella comprises a thin layer of collapsed plant and/or algae cell walls forming a semi-crystalline structure in which a crystalline component of a glucose based biopolymer (typically a polysaccharide and/or glycoprotein) of the plant and/or algae cell wall, is immersed in an amorphous matrix of other sugar-based and/or phenol-based biopolymers, typically carbohydrate, polysaccharide or oligosaccharide, phenolic biopolymerics, of the plant and/or algae cell wall. The semi-crystalline structure can further comprise additional material and in particular, additional material from the plant and/or algae cell and/or cell wall, as will be understood by a skilled person.

As used herein, "crystalline" when used in connection with a biopolymer refers to a structural characteristic of a biopolymer which is arranged periodically in an ordered microscopic structure, forming a crystal lattice that extends in all direction.

Conversely the wording "amorphous" when used in connection with a biopolymer indicates a biopolymer that lacks the long-range order that is characteristic of a crystal.

Accordingly, a "crystalline" biopolymer as used herein indicates a biopolymer that has a crystalline structure or if the biopolymer can have both amorphous and crystalline structure the percentage of the biopolymer that is present in a crystalline form when the biopolymer can also be present in both amorphous form. The crystallinity can be determined experimentally by X-ray powder diffraction pattern based on measurement of the intensity of a diffraction peak using crystalline form and amorphous forms as control samples.

The wording "semi crystalline" material as used herein is a substance that has less than 100% of crystallinity and higher than 0% of amorphous content, including 50% each of crystallinity and amorphous contents. By the term "rigid semi crystalline," it is meant that a semi-crystalline material has a high degree of order and periodicity which leads to higher stiffness and strength compared to other non-crystalline biopolymers in the cell wall composite, it is therefore the load-bearing or reinforcing component.

In some embodiments, the crystalline component comprises polysaccharide fibrils in an amorphous matrix of sugar based and/or phenol-based biopolymer from cell walls of the compacted plant and/or algae cells. In particular in biocomposite of the present disclosure, wherein the plant and/or algae cells comprise a plant cell, crystalline component comprises polysaccharide fibrils, and in particular cellulose fibrils.

The term "polysaccharide" as used herein indicates any polysaccharide that comprises at least three monosaccharide monomeric moieties. Exemplary monosaccharide monomeric moiety includes D-glucose units, D-mannopyranuronose, L-gulopyranuronose, and L-gulopyranuronic acid.

The term "fibril" as used herein indicate an linear aggregate composed of linear biopolymers, characterized by rod-like structures with a thickness of 1 to 10 nm and a high length-to-diameter ratios of at least 2 to 1, preferably at least 10 to 1, more preferable at least 100 to 1. Fibrils can spontaneously arrange into helical structures. Fibrils are usually found alone but rather are parts of greater hierarchical structures commonly found in biological systems. Differences in structure between fibrils of different origin is typically determined by x-ray diffraction. A scanning electron microscope (SEM) can be used to observe specific details on larger fibril species.

The term "fiber" as used herein indicates rod shaped substance that has a length at least twice longer than its width or diameter having thickness between 10-50 nanometers and forming micro to milli-scale structures. As used herein, a fiber can made of a plurality of fibrils arranged in parallel and in contact with each other.

Polysaccharide fibrils in the sense of the disclosure comprise any polysaccharide that comprises at least three monosaccharide monomeric moieties aggregates as a rod structure. Exemplary polysaccharide fibril includes cellulose which comprises β(1→4) linked D-glucose units. Another exemplary polysaccharide fibril includes alginate fibril which comprises repeat sequences of β-D-mannopyranuronosyl-(1→4)-α-L-gulopyranuronosyl-(1→4)-α-L-gulopyranuronate.

In biocomposite of the present disclosure, wherein the plant and/or algae cells comprise an algae cell, comprise e crystalline glucose based biopolymers, such as hydroxyproline-rich glycoproteins, polysaccharide fibrils such as cellulose, alginic acid or calcium alginate, a biopolymer containing or a polysaccharide of beta-1,3-xylan, beta-1,4-xylan, and/or beta-1,4-mannan, in particular wherein the plant and/or algae cells comprise an algae cell.

In biocomposite of the present disclosure crystalline biopolymers within a lamella are comprised within an amorphous matrix comprising sugar-based biopolymers and/or phenol-based biopolymers from the cell wall of the plant and/or algae cells.

The term "amorphous matrix" as used herein indicates a solid that lacks a long range order and which serves to embed another solid substance. Accordingly an amorphous matrix is characterized by a highly irregular structure compared with that of the crystalline component and can have a gel-like consistency.

In biocomposite of the present disclosure, the composition of an amorphous material and is moreover known to vary considerably as a function of the cell wall composition of the plant and/or algae cells of the disclosure.

In biocomposite of the present disclosure, the amorphous matrix can be a polysaccharide matrix which can optionally comprise phenol-based biopolymers such as lignin or lignols.

In particular, in biocomposite of the disclosure comprising a plant cell, the amorphous polysaccharide matrix can comprise hemicelluloses and pectin and optionally lignin.

In a biocomposite of the disclosure comprising an algae cell, the amorphous polysaccharide matrix can comprise hemicellulose, pectin, ligninol, carrageenan, agar, a polysaccharide or a biopolymer containing at least one of xylogalactoarabinan, glucuronoxylorhamnan, rhamnoxylogalactogalacturonan, and 3-deoxylxo-2-heptulosaric acid or any sulfated derivative thereof.

In some embodiments of the biocomposite as described herein, the polysaccharide fibril comprises cellulose fibrils and the polysaccharide amorphous matrix comprises hemicellulose, pectin and optionally lignol, or any combination thereof.

In some embodiments of the biocomposite as described herein, the polysaccharide fibril comprises includes alginate and the polysaccharide amorphous matrix comprises carrageenan an/or agar, and optionally cellulose, hemicellulose, pectin and/or any combination thereof.

In embodiments of the biocomposite as described herein, the polysaccharide fibril comprises cellulose in a polymorph of Iα, Iβ, II or III or any combination thereof.

In some embodiments of the biocomposite as described herein, the fibrils comprise cellulose in form of crystalline or semi-crystalline cellulose microfibril.

In some embodiments the biocomposite as described herein comprises cellulose in an amount ranging up to 30.0 wt %, possibly up to 15.0 wt % or up to 5 wt %.

In some embodiments, the biocomposite as described herein comprises hemicellulose in an amount up to 30%, possibly up to 20% up to 10 wt % or up to 5 wt %.

In some embodiments the biocomposite as described herein comprises pectin in an amount up to 30.0 wt %, possibly up to 10.0 wt % or up to 5 wt %.

In some embodiments the biocomposite as described herein, comprises lignols in an amount up to 10.0 wt %, possibly from 5% to 10% or possibly up to 5 wt %.

In some embodiments the biocomposite as described herein, wherein the plant and/or algae cells are from tobacco can comprise 15 wt % cellulose, 20 wt % hemicelluloses, 6.8 wt % pectins and 6.3 wt % lignols.

In biocomposite of the disclosure, each lamella independently has a thickness of 100 nm to 5 μm.

In some embodiments of the biocomposite of the disclosure, lamellae can independently have a thickness of 20 nm to 100 nm. In some of those embodiments, the plant and/or algae cell comprise or consist of algae cells.

In some embodiments of the biocomposite of the disclosure, lamellae can independently have a thickness of 100 nm to 300 nm. In some of those embodiments, the plant and/or algae cell comprise or consist of plant cells with a primary cell wall and without a secondary cell wall.

In some embodiments of the biocomposite of the disclosure, lamellae can independently have a thickness of 20 nm to 300 nm. In some of those embodiments, the plant and/or algae cell comprise algae cells plant cells with a primary cell wall and without a secondary cell wall.

In some embodiments of the biocomposite of the disclosure, lamellae can independently have a thickness of 300 nm up 5μ. In some of those embodiments, the plant and/or algae cell comprise or consist of plant cells within one or more secondary cell wall.

In some embodiments of the biocomposite as described herein, lamellae can independently have a thickness ranging from 50 nm to 300 nm.

In some embodiments of the biocomposite as described herein, lamellae can independently have a thickness ranging from 150 nm to 250 nm.

In some embodiments of the biocomposite as described herein, lamellae can independently have a thickness ranging from 175 nm to 200 nm.

In general in biocomposite of the instant disclosure a hierarchical and anisotropic lamellar microstructure with compacted cells are aligned along a plane. In the nanoscale, at the sub-cellular level, a fibrillar multi-lamellated structure is also observed.

In particular biocomposites of the disclosure the lamellae can be detected by microscopy images which show folded lamellae, derived from compacting cells. In particular in biocomposites of the disclosure microscopy will show the layers formed by cell walls only found in plant cells/algae in this unique configuration, in which polysaccharide fibers (e.g. cellulose fibers) are included in the amorphous matrix of polysaccharides (see e.g. Example 5 and FIG. 7 panel (A)). The arrangement of fibrils in the matrix can vary as well as their distancing within a lamella and the distancing between lamellae, which would have the polysaccharide fibrils (e.g. rigid semi-crystalline cellulose) t dispersed in an amorphous matrix.

In some embodiments, in a lamella of the biocomposite herein described, the semi-crystalline structure are disposed on a plane.

In some embodiments, in a lamella of the biocomposite herein described, at least 5% of the glucose based biopolymers of the crystalline component are aligned in parallel, In some of those embodiments the glucose based biopolymers comprises fibrils of a polysaccharide such as cellulose.

In some embodiments, in a lamella of the biocomposite herein described at least 50% of the glucose based biopolymers of the crystalline component are aligned in parallel. In some of those embodiments the glucose based biopolymer comprises fibrils of a polysaccharide such as cellulose.

In some embodiments, in a lamella of the biocomposite herein described at least 90% of the glucose based biopolymers of the crystalline component are aligned in parallel. In some of those embodiments the glucose based biopolymers comprises fibrils of a polysaccharide such as cellulose.

In some embodiments, in a lamella of the biocomposite herein described wherein the glucose based biopolymers of the crystalline component comprises fibrils the fibril has a diameter ranging from 1 to 30 nm. In some of those embodiments, the biopolymer is a polysaccharide and in particular cellulose.

In embodiments of the biocomposite as described herein, the semi-crystalline polysaccharide wherein the glucose based biopolymers of the crystalline component comprises fibrils the fibril is bound in a biopolymer matrix.

In some embodiments, the biocomposites of the disclosure capitalizes on the plant cell's ability to synthesize intricate multi-lamellated structures of cellulose, hemicellulose, lignin and pectin in their cell walls. The use of different cell cultures and/or genetically modified species allows the fabrication of materials with significantly altered properties.

In some embodiments from chemical and structural characterizations the biocomposites of the disclosure is composed of the native primary cell wall components: a heterogeneous multi-lamellated mixture of semicrystalline cellulose fibrils, in an amorphous network of heteropolysaccharides (hemicelluloses and pectin) and phenolic compounds which are the lignin precursors (monolignols).

In the present disclosure, undifferentiated tobacco cells are used as an exemplary and representative model system to provide representative examples of biocomposites of the disclosure and related compositions, methods and systems. These cells multiply rapidly (ca. a factor of 80-100 every 7 days (22), can be used to produce materials in-situ, and can be cold pressed in molds of different shapes and sizes. The herein described materials retain the native plant cell wall composition naturally secreted by growing plant cells, to achieve mechanical performance comparable to structural and engineered woods, and polymers. The microstructure, composition and mechanical properties of the produced panels are characterized as described in the Examples section. It is shown that the incorporation of filler additives allows improvement of the material's performance and expands their functionalities, for example creating magnetic and electrically conductive materials. The results obtained for tobacco cells have been confirmed by experiments in Arabidopsis and in the algae *Chlamydomonas reinhardtii* which provides a representative example of algae cells suitable for the preparation of the biocomposite of the instant disclosure.

In some embodiments, based on the results obtained in the representative examples of Tobacco and *Chlamydomonas reinhardtii*, the biocomposite of the disclosure can have a flexural modulus 0.1-7 GPa, modulus of rupture 5-95 MPa, Young's modulus 1.5-5 GPa, tensile strength 9-25 MPa, and/or compressive modulus GPa. In some of those embodiments, the biocomposite comprises plant cells from tobacco cells, cells from Arabidopsis and/or *Chlamydomonas reinhardtii*.

Biocomposite according to the present disclosure can be used as biodegradable environmentally friendly alternative to non-degradable materials, which typically survive in landfills. In particular, biocomposite of the present disclosure of 20-50 mm$^3$ in volume disintegrates in water in a time ranging from 24 hrs to 1 week and flakes between 0.1-2 mg in weight are expected degrade in soil in a time ranging from 10 weeks to 15 weeks, possibly between 12 to 14 weeks depending on plant and/or algae cells comprised within the biocomposite. Accordingly, biocomposite of the present disclosure can be disintegrated or degraded by putting it in soil or water.

Biocomposite according to the present disclosure can have a controlled longevity if placed under controlled humidity, in particular, in an indoor environment can remain substantially as fabricated for time period of at least three years or more depending on the features of the biocomposite. Longevity biocomposite of the instant disclosure can be increased by addition of a polymer coating as will be understood by a skilled person upon reading of the present disclosure.

In some embodiments of the biocomposite as described herein, the biocomposite further comprises at least one additive The term "additive" as used herein refers any material is comprised within the plurality of plant cells in a biocomposite according to the instant disclosure. An additive can for example be a filler, or a binder.

The term "filler" as used herein refers to any solid material that are mixed with dehydrated cells in the biocomposite and which retains a boundary of the solid material in the biocomposite. Exemplary filler includes natural or artificial fibers, and in particular plant fiber such as flax fiber and inorganic particulate.

The term "inorganic particulate" as used herein refers to a solid material that are equal to or less than 1 centimeter in a longest dimension that does not contain carbon-hydrogen bond. Exemplary fillers include carbon fiber, graphene, halloysite, montmorillonite nanoclay, iron oxide nanoparticle. The filler can have amorphous or crystalline. The inorganic particulate can have a regular or irregular shape. Regular shape includes, for example, sphere, prolate ellipsoid, oblate ellipsoid, rod or cylinder, cube, or flake. The inorganic particulate can, for example, have a longest span of 1 nanometer to 1 centimeter, 1 micron to 1 millimeter, or 10 microns to 100 microns. For example, an iron oxide nanoparticle can, for example, shape as a sphere with a diameter of 1 to 100 nanometers.

The term "longest span" refers to the greatest distance between any two points in a solid of any shape. For example, a spherical particle would have a longest span equal to a diameter of the spherical particle. A rod shape particulate would have a longest span equal to the longitudinal dimension of the rod. A fiber component of a plant cell can, for example, have a longest span of 100 micron to 10 centimeters.

The term "binder" as used herein refers to any material that is mixed with dehydrated cells in a biocomposite and which permeates continuously throughout the solid surfaces in the biocomposite.

Different filler particles expand the biocomposites' property space. Elastic modulus can be plotted as a function of density of different plant-based biocomposites as described in the Examples section and related illustration where plots with respect to, pure cell matrix (BC), biocomposites containing various amounts of CF, halloysite and montmorillonite nanoclays (NC) and graphene (G). are shown Their properties lie at the intersection of natural cellular materials, including "wood products", and commercial plastics (see Example 12) presenting elastic moduli spanning over one order of magnitude as will be understood by a skilled person upon reading of the present disclosure.

Filler additives also endow new functionalities, such as electrical conductivity or magnetic properties. The electrical conductivity of plant cell/CF composites, for example, can be tuned varying the CF content in which the IV plots of biocomposites containing 1 and 20 wt % of CF illustrate the effective tuning of electrical conductivity from $2.25 \times 10^{-7}$ S/m to $2.2 \times 10^{-3}$ S/m. (see Example 12).

In some embodiments wherein a filler is included in the biocomposite material of the disclosure biocomposites can include up to 40 wt % filler additives in amount and type selected depending on the desired mechanical properties of the resulting biocomposite.

In some embodiments, for example, wherein a filler is included in the biocomposite material of the disclosure, a strength enhancement of the biocomposite is obtained, for example in connection with addition of about 12% at 5 wt % of carbon fibers, followed by a monotonic decrease at higher filler loadings. This is a behavior typically observed in polymer composite materials, in which at low filler concentrations a more efficient filler dispersion can be obtained, thereby enabling successful load transfer between the two components. In contrast, at higher concentrations, the filler particles aggregate, thus contributing to an inhomogeneous stress distribution upon loading which leads to overall inferior mechanical performance (Roumeli et al., 2014), In some of these embodiments, the plant and/or algae cell is a tobacco cell and the filler is a carbon fiber.

Similarly, the addition of 13.5 wt % iron oxide nanoparticles (IN) in the plant cell matrix conveys ferro-magnetic properties, which allow the biocomposite to support more than five times, or six times its weight when attracted by a magnet. (see Example 12). In some of these embodiments, the plant and/or algae cell is a tobacco cell and the filler is iron.

In some embodiments of the biocomposite as described herein, the at least one filler is a natural filler is comprised in biocomposite in addition to the plurality of plant cells.

In embodiments of the biocomposite as described herein, the natural filler is a plant fiber.

In embodiments of the biocomposite as described herein, the plant filler is a flax fiber embedded in the dehydrated cell.

In embodiments of the biocomposite as described herein, the natural filler is a biomass.

In embodiments of the biocomposite as described herein, the natural filler is a silk fiber.

In embodiments of the biocomposite as described herein, the at least one filler is selected from the group consisting of carbon fiber, graphene, halloysite, montmorillonite nanoclay, and iron oxide nanoparticle or any combination thereof.

In embodiments of the biocomposite as described herein, the at least one filler comprises iron oxide nanoparticle in an amount of 5.0-25.0 wt %.

In embodiments of the biocomposite as described herein, the at least one filler comprises iron oxide nanoparticle in an amount of 10.0-15.0 wt %.

In embodiments of the biocomposite as described herein, the biocomposite further comprises at least one binder.

In embodiments of the biocomposite as described herein, the at least one binder is selected from the group consisting of alginate, chitosan, pectin, lignin and cellulose, or any combination thereof.

In embodiments of the biocomposite as described herein, the alginate, chitosan, pectin, lignin and cellulose are each present in an amount of 0.1 to 10.0 wt %.

In embodiments of the biocomposite as described herein, the biocomposite is part of a product comprising makeup container, food container, food packaging material, toy packaging material, shipping packaging material, cafeteria trays, furniture, clothes hanger, and multi-use packaging.

In some embodiments of the biocomposite as described herein, the biocomposite can be coated with one or more materials to provide additional properties to the biocomposite material. In particular, hydrophobic material is coated with a hydrophobic polymer to impart water resistance to the biocomposite.

The term "hydrophobic polymer" refers to any polymeric organic material that has a static water contact angle θ that is greater than 90° (Kock-Yee Law 2014).

In particular when not requiring waterproof material where it is desired, such as application of a polymer coating on surface of the device made of the biocomposite material herein described.

In some embodiments of the biocomposite as described herein, the hydrophobic polymer can be selected from poly(dimethylsiloxane), polymethylmethacrylate, polyethylmethacrylate, polymethylacrylate, polyethylacrylate, polybutylacrylate, polyethylene, polypropylene, EPDM rubber, polyvinyl chloride, polyvinylfluoride, polyvinylidene fluoride, polytetrafluoroethylene, perfluoroalkoxy polymer, poly(butadiene), poly(isoprene), ethylene-butene copolymer, poly(norbornene), poly(siloxane), polyester, and polyurethane, epoxy resin or any combination thereof.

Biocomposites herein described are provided with a fabrication method according to the present disclosure which allows formation of the lamellar configuration of the biocomposite from plant and/or algae cells leveraging the naturally occurring composite nature of the cell wall of plant and/or algae cells, while minimizing pores formation and/or dimension of the pores. In particular in the fabrication method of the present disclosure the cell walls of the plant and/or algae cell are compacted in a semi-crystalline structure comprising biopolymers of the cell wall according to a process that minimizes the formation of pores as will be understood by a skilled person upon reading of the present disclosure.

The fabrication method of the present disclosure comprises compacting along a plane a cultured biomass comprising cultured plant cells from a suspension culture having a water content of at least 10 wt %.

The wording "cultured cells" as used herein indicates cells under controlled conditions, generally outside their natural environment. Accordingly, "cultured plant cells" indicates plant cells under controlled conditions outside their natural environment. Typically, cultured plant cells are isolated from a feedstock biomass and/or from living organisms comprising plant cells according to the present disclosure, and subsequently be maintained under controlled culture conditions.

The term "biomass" as used in the present disclosure indicates material of biological origin. The term "feedstock biomass" as used herein indicates a raw and/or, unprocessed material of biological origins used as a basic material. In particular feedstock biomass can be used to produce goods, finished products, energy, or intermediate materials that are feedstock for future finished products., or primary commodity, production of energy (electricity or heat), or in various industrial processes as raw substance for a range of products. Feedstock biomass comprising plant cells in the sense of the disclosure comprises purposely grown energy crops (e.g. miscanthus, switchgrass), wood or forest residues, waste from food crops (wheat straw, bagasse), horticulture (yard waste), food processing (corn cobs) and additional feedstock biomass identifiable by a skilled person upon reading of the present disclosure.

In some embodiments, the feedstock biomass can be formed or comprise from agricultural waste and/or agricultural residues (e.g., corn stove, fibers and/or particles r), Algae, dedicated energy crops (e.g., switchgrass, miscanthus, energy cane, sweet sorghum, high biomass sorghum, hybrid poplars, and shrub willows), forestry residues (e.g., logging residues and forest thinning), waste streams and re-useable carbon biosources (e.g., the non-recyclable organic portion of municipal solid waste, biosolids, sludges, waste food, and manure slurries).

In embodiments of the instant disclosure, cells isolated from a feedstock biomass (e.g. from a plant tissue or from an algae) are cultured in a suspension culture. In particular, in some embodiments of the fabrication method herein described, a plant cells and/or algae cell can be separated from a feedstock biomass and mixed with culture medium to provide a plurality of cultured plant cells in a suspension culture.

The wording "suspension culture" or "cell suspension" as used herein indicates a type of cell culture in which single cells or small aggregates of cells (e.g. clumps up to 50 cells, possibly from 5 to 20 cells depending on the specific type of cells) are allowed to function and multiply in an agitated growth medium, thus forming a suspension. Suspension cultures are used in addition to so-called adherent cultures. The cells themselves can either be derived from homogenized tissue or from another type of culture.

In some embodiments of the fabrication methods of the present disclosure, after being harvested, cultured plant cells from a suspension culture are subsequently typically maintained under controlled conditions. These conditions vary for each cell type, but generally consist of a suitable vessel with a substrate or medium that supplies the essential nutrients (amino acids, carbohydrates, vitamins, minerals), growth factors, hormones, and gases ($CO_2$, $O_2$), and regulates the physio-chemical environment (pH buffer, osmotic pressure, temperature). Most cells require a surface or an artificial substrate (adherent or monolayer culture) whereas others can be grown free floating in culture medium (suspension culture). The lifespan of most cells is genetically determined, but some cell culturing cells have been "transformed" into immortal cells which will reproduce indefinitely if the optimal conditions are provided.

In embodiments of the fabrication methods of the present disclosure, cells from the suspension culture comprising plant and/or algae cells, are separated from the suspension culture (e.g. by filtration) to provide a cultured biomass from the suspension culture, typically comprising single cells or small clumps of cells (e.g. up to 20 or 50 cells). For example, cells can be separated from medium by vacuum filtration (e.g. an Erlenmeyer flask with a filter paper with a mesh of 1-25 micrometers connected to a vacuum pump.

In embodiments of the fabrication method herein described, the cultured biomass of a cultured plant and/or algae cells separated from the culture medium is then prepared for further compression.

In particular, in embodiments of the fabrication method of the instant disclosure, the cultured biomass compressing plant cells and/or or algae cells is compacted to eliminate unbound water in the biomass while forming a lamellar structure minimizing presence and/or size of pores. In particular in fabrication method of the instant disclosure, the compacting is performed by applying a pressure for a time and under condition to control their dehydration and aggregation.

In some embodiments of the methods to provide biocomposite of the instant disclosure, fabrication method is described according to which the cultured biomass can be compressed inside a compression tool to obtain a condensed lamellar structure.

In particular, in fabrication method of the disclosure, the cultured biomass is then compressed along a plane by continuously applying to the cultured biomass an increasing pressure perpendicular to the plane until reaching an applied pressure corresponding to the turgor pressure of the cultured plant and/or algae cells to provide a compacted biomass.

The word "turgor" as used herein with respect to a plant cell indicates the state of turgidity and resulting rigidity of cells or tissues, typically due to the absorption of fluid. Accordingly any plant cells in the sense of the disclosure has a turgor pressure, wherein the wording "turgor pressure" or "hydrostatic pressure" indicates the force within the cell that pushes the plasma membrane against the cell wall. The turgor pressure, is defined as the pressure measured by a fluid, measured at a certain point within itself when at equilibrium. Generally, turgor pressure is caused by the osmotic flow of water and occurs in the plant cells. The pressure exerted by the osmotic flow of water is also called turgidity. It is caused by the osmotic flow of water through a selectively permeable membrane. Osmotic flow of water through a semipermeable membrane is when the water travels from an area with a low-solute concentration, to one with a higher-solute concentration. In plants cells in the sense of the disclosure, this entails the water moving from the low concentration solute outside the cell, into the cell's vacuole.

In embodiments of the method as described herein, the applied pressure corresponding to the turgor pressure of the cultured plant and/or algae cells ranges from 0.1 to 5.0 MPa.

In embodiments of the method as described herein, the applied pressure corresponding to the turgor pressure of the cultured plant and/or algae cells ranges from 0.5 to 1.5 MPa.

Typically, in embodiments of the method as described herein, the applied pressure corresponding to the turgor pressure of the cultured plant and/or algae cells ranges between 0.8-1.0 MPa.

Typically, in embodiments of the fabrication method of the disclosure the increasing pressure comprises a start pressure ranging from 5% to 15% of the turgor pressure.

In embodiments of the method as described herein, the rate of increasing pressure is a constant ranging from 0.01 to 0.5 MPa/day.

In embodiments of the method as described herein, the rate of increasing pressure is a constant ranging from 0.05 to 0.15 MPa/day.

In some embodiments of the methods to provide biocomposite of the instant disclosure, the selected biomaterials are compressed at a continuous and varying pressure to control their compaction and corresponding dehydration over time. In particular the applied pressures increases over time (e.g. with a step function or linear increase) to provide a compressed biomass.

In some embodiments continuously applying pressure can be performed to continuously apply a pressure increasing according to a step function. In preferred embodiments continuously applying pressure can be performed to continuously apply a pressure increasing linearly to minimize pores formation and diameter.

In some embodiments, the continuously applying pressure can be performed by applying continuous pressure up to 0.8 MPA increasing the pressure of 0.1 MPa per day up to 0.8 MPa. In some of these embodiments, the applying can be performed from a time ranging from 6 to 8 days, or from 5 to 7 days. In some embodiments, the continuously applying pressure can be performed by applying continuous pressure for 4-5 days.

In the fabrication method of the present disclosure typically a compressed biomass is obtained after a mass loss of at least 50% and possibly at least 80% with respect to the cultured biomass before compressing. Mass loss can be detected by weighing and the cultured biomass and weighing the compressed biomass and compare the cultured biomass and the compressed biomass weight as will be understood by a skilled person.

In embodiments of the fabrication methods herein described, the compacting further comprises drying the compressed biomass by at least one of applying to the compressed biomass a drying pressure and/or applying a drying temperature to the compressed biomass to obtain a biocomposite material having water content of 0.1-15 wt %, a mass loss of 80-99% and/or a dry density of 500-1500 kg/m3 having the features of the biocomposite of the instant disclosure.

In preferred embodiments, the drying pressure can be applied continuously. In preferred embodiments, the drying pressure can be applied linearly and more preferably linearly and continuously. In some embodiments, the drying pressure can be the applied pressure corresponding to the turgor pressure of the cultured plant and/or algae cells. In some embodiments, the drying pressure can be higher than the applied pressure corresponding to the turgor pressure of the cultured plant and/or algae cells (e.g. two or three times higher). In some embodiments the drying pressure can be >50% of the turgor pressure depending on the plant and/or algae of the compressed biomass. In some embodiments a drying pressure up to 5 MPa can be applied to compressed biomass in the sense of the disclosure.

In some embodiments applying to the compressed biomass the applied pressure is performed to obtain: a biocomposite material having a water content of less than 12, wt %, less than 10 wt %, from 6 wt %, to 8 wt %, or less than 1 wt %.

In some embodiments applying to the compressed biomass the applied pressure is performed to obtain: a biocomposite material having a mass loss of 97 to 99% in particular when the plant and/or algae cells of the compressed biomass comprise plant cells or to 85 to 90% mass loss in particular when the plant and/or algae cells of the compressed biomass comprise algae cells.

In some embodiments applying to the compressed biomass the applied pressure is performed to obtain: a biocomposite material having a dry density of 500-1500 kg/m3, 900 kg/m3 and 1100 kg/m3, or between 900 kg/m3 to 1000 kg/m3 in particular when the plant and/or algae cells of the compressed biomass comprise algae cells.

In some of those embodiments applying to the compressed biomass the drying pressure corresponding to the turgor pressure of the cultured plant and/or algae cells can be performed without drying for two weeks up 1 month to up to 2 month depending on the materials.

In some preferred embodiments, the compressed biomass undergo temperature cycles to control their dehydration over time. In those embodiments of the fabrication method as described herein, the method can further comprises applying a: drying temperature the compressed biomass optionally after a first or second weight for a drying time.

In those embodiments of the method as described herein, the drying temperature can range from room temperature to a temperature lower than the degrading temperature of the material (typically below 110° C., 130° C. or 150° C.). Typically the drying can be performed with a temperature ranging from 20 to 100° C., and in particular, ranging from 40° C. to 85° C. In some embodiments heating at temperature up to 60° C. may be applied to accelerate the dehydration process.

In embodiments of the method as described herein, the drying time ranges from 0.1 to 480 hours.

In embodiments of the method as described herein, the drying time ranges from 24 to 72 hours.

In particular, in some embodiments, the drying can be performed for of 2-48 hours at a temperature ranging from 40° C. and 85° C., possibly at 60° C.

In some embodiments of the fabrication methods of the instant disclosure, the drying can be performed concurrently with the compressing, wherein the selected biomaterials are compressed at varying pressure to control their dehydration over time, where compression is applied by a hydraulic hot press. In those embodiments, the temperature can be selected in combination with the applied pressure to allow increasing compression until reaching an applied pressure corresponding to the turgor pressure of the plant and/or algae cells in the biomass.

In some embodiments of the fabrication methods of the instant disclosure, a drying (dehydration) step can be performed on the extracted biomass before compressing, in addition or in the alternative to the drying during the compression and/or after the compressing step For example, the process can be performed also using a hot-press in which high temperature contributes to the fabrication by speeding up the entire process in combination with the applied pressure.

An exemplary workflow of the method to provide biocomposite of the disclosure is schematically illustrated in FIG. 1.

Plant cells are harvested from a suspension culture (and compress them in a permeable mold, (See FIG. 1 Panels A to C)).

During compression, water diffuses through the plant cell wall and the cell volume is gradually reduced. Compression is performed to achieve a densified dehydrated structure.

In particular, in bottom-up fabrication method is illustrated in FIG. 1, plant cells or microalgae are harvested from a stable culture at specific stages of their development, and subject them to a controlled compression process. By compressing the cells inside a mold with increasing pressure over time, water diffuses through the permeable cell wall, while the cell volume is gradually reduced.

When the cells reach a dry state, corresponding to an approximate 80-99% weight loss and in particular 98% weight loss, the process is terminated, and the resulting material is essentially a lamellar stack of compacted cell walls. (See FIG. 1 Panels D to F)). Exemplary procedures according to the approach schematically described in FIG. 1 are described in Examples 3 and 11 of the instant disclosure.

The resulting biocomposite material of the present disclosure comprise native plant cell wall composition, with cell wall biopolymers, primarily the native cellulose, hemicelluloses and pectins, maintained after cell dehydration and organized in a lamellar configuration. Characterization of microstructure, composition and mechanical properties of the produced material are disclosed, and which illustrate by example the obtained properties by incorporating synthetic filler additives.

In some embodiments, starting from undifferentiated plant cells and/or algae, the stiffness and strength of the produced biocomposites exceed the corresponding performance of some commercial plastics of the same density, for example polystyrene, and low-density polyethylene, while being entirely biodegradable. The mechanical properties of these composites are tunable upon selection of fabrication conditions.

In some embodiments of the method of the disclosure, starting from algae, biodegradable composite materials are produced with mechanical properties similar to those of particle boards commercially used for ready-to-assemble furniture. Upon controlled dehydration under compression, algae are able to bind together fibers and filling particles. Algae have an enormous diversity and their large range of different compositions and structures can result in different mechanical properties and functions. They have a beneficial impact on the environment since they mitigate the carbon excess in the atmosphere by consuming large quantities of $CO_2$ during growth (e.g., to produce 1 Kg of microalgae, about 2 Kg of $CO_2$ are typically sequestered [H. Herzog, D. Golomb, Encyclopedia of Energy 1: 1-11 (2004)]).

In an exemplary embodiment of the fabrication method of the disclosure plant cells and/or algae cells extracted from a suspension culture, in a hydrated form, with a water content above 10 wt %, are transferred in a permeable mold with a porosity at least 5%, and the material can be either metal, alloy, polymer or ceramic. The biomass is then compacted by applying pressure with the mold. The applied pressure rate can be selected depending on the feedstock material. The application of heat during compression can be used to reduce processing time. When the feedstock material has reached a weight loss of more than 50% compared to it's original state, the biocomposite can be extracted from the molds and subjected to a final drying step at temperatures below 100° C. for at least 2 hr. Addition of additives id desired can be typically performed by mixing the additive with the culture biomass to create hybrids before the transferring, or after providing the compressed biomass at least for additives to be applied as a coating.

Drying of the cultured biomass separated from the suspension culture can also be optionally performed if control of water content is desired.

In particular an exemplary fabrication method of the disclosure can comprise the step of extracting a biomass comprising plant and/or algae cells in a hydrated state from a culture suspension, for example using a vacuum filtering system to separate the culture biomass from growth media. The fabrication method can further comprise weighing the collected biomass and optionally mixing and optionally mixing one or more additives, the mixing either manual or with assistive equipment (e.g. stirrer, ultrasonication) are used to homogenize the mixture. If control of water content is desired in view of the features of the biocomposite, the biomass can be dried at this step in addition or in alternative to the mixing. Oven drying at temperatures below 100° C. for the duration that is required to reach the water loss desired. The fabrication method further comprises transferring the biomass with or without additives into the mold and applying pressure. Calibration of the pressure rate dictates the appropriate compression protocol; in an exemplary embodiment with a biomass comprising plant cells and their composites 0.1±0.05 MPa/day till 0.8 MPa was used, followed by 2 days at 0.8 MPa. In the fabrication process the biocomposite material can be extracted from the mold after a mass loss of more that 50% is achieved, and dried for a minimum of 12 h at a temperature below 100° C.

An exemplary side by side illustration of parameters of the method of the disclosure performed with plant cells and algae cells is reported in Table 1 below

TABLE 1

| | Initial water content | Pressure rate | Post-process dry | Final retained solid mass (100% corresponds to the starting wet biomass) |
|---|---|---|---|---|
| plant cell biomass | 70 ± 10 wt % | 0.1 ± 0.05 MPa/day till 0.8 MPa | 48 h at 60° C. | 2 ± 1 wt % |
| algae biomass | 70 ± 10 wt %* | 0.1 ± 0.05 MPa/day till 0.8 MPa | 48 h at 60° C. | 10 ± 5 wt % |

In an exemplary process to provide biocomposite from plant and/or algae cells in the sense of the disclosure, the pressure-time profile can be calibrated to achieve maximum product density. For example, in biocomposite formed starting from plant cells the biomass used in a hydrated state of 60-80 wt % water can be provided with no pre-drying step to control or reduce water content. In order. to achieve a density of 1100±100 kg/m$^3$, a 0.1±0.05 MPa/day rate compression rate can be selected to a maximum of 0.8 MPa followed by a 2-day constant compression at 0.8 MPa. A post-manufacturing drying step (48 h at 60° C. in a benchtop oven) can be applied and the retained until the dry sample mass was 2±1 wt % of the initial wet biomass. This last step does not eliminate all bound water and as all cellulose-based materials, storing them in ambient conditions will result in atmospheric water uptake. In some embodiments, absence of drying step and/or water uptake, following fabrication do not affect mechanical properties of the resulting biocomposite. In embodiments wherein the biocomposite is provided from an algae biomass, the final material obtained in outcome of this exemplary fabrication process has a weight which can be 10±5 wt % of the initial wet biomass and the density was 980±130 kg/m$^3$.

In some embodiments of the methods to provide biocomposite of the instant disclosure, plant cells, algae, and biomass from agricultural waste (or combinations or the three) can be compressed inside a mold to obtain a condensed lamellar structure, wherein the selected algae are *Chlamydomonas, Desmodesmus*, or a combination of the two or wherein the selected starting biomass comprises cyanobacteria.

In some embodiments of the methods to provide biocomposite of the instant disclosure, an approach to fabricate bulk, biological matrix composites based on plant cells, which grow and rapidly multiply in suspensions. To form lamellated panels of arbitrary geometries, harvested cells are dehydrated and compressed under controlled conditions, without the need for harsh chemical treatments or binders. The properties of these biocomposites are comparable to wood and wood products and superior to other self-growing natural composite materials. The biocomposites' properties can be further tuned varying the fabrication process. For example, filler particles can be integrated during fabrication, to vary the mechanical response or introduce new functionalities. The process herein described introduces a novel class of biocomposite materials that can be extended to different plant cells and scaled for large production.

In some embodiments of the methods to provide biocomposite of the instant disclosure, a natural bulk biocomposite material can be thus created based on plant cells. The method capitalizes on the plant cell's ability to synthesize intricate multi-lamellated structures of cellulose, hemicellulose, lignin and pectin in their cell walls. The use of different cell cultures and/or genetically modified species allows the fabrication of materials with significantly altered properties. Similar fabrication approaches are contemplated for other biological systems including but not limited to algae, and fungi that can provide complex elements as building blocks for advanced composite biomaterials.

In some embodiments the methods to provide biocomposite of the instant disclosure uses a natural biopolymer mixture as a matrix and incorporate filler additives, which (i) introduces new properties/functions in the composites, and (ii) enables further tuning of the mechanical performance. The addition of different amounts of carbon fibers (CF), for example, changes the biocomposites' compressive modulus and strength For CF concentrations below 5 wt % there is a gradual improvement of elastic modulus and strength, in the order of 20-25%, followed by a decrease for higher concentrations, as observed in polymer composites because of fillers' aggregation (38) (see Example 12).

Accordingly, in some embodiments of the methods to provide biocomposite of the instant disclosure, biocomposite materials are provided in which cyanobacteria are combined with dehydrated plant cells or algae (or a combination of them).

In some embodiments of the methods to provide biocomposite of the instant disclosure, biocomposite materials are provided in which synthetic and/or natural fillers (for example silk fibers, flax fibers, nanoclay) are immersed in a matrix made of dehydrated plant cells or algae (or a combination of them).

In some embodiments of the methods to provide biocomposite of the instant disclosure, tests can be performed to show that a controlled dehydration of microalgae can form a homogeneous matrix that is capable of binding together particles obtained by crushing or milling biomass from agricultural waste. These composites (APBs) already have mechanical properties similar to those of particle boards typically used for furniture and kitchen applications (see preliminary results in attachments). Different strains of algae and different types of agricultural waste can be used to tune the mechanical properties of the material. Different scaled up production processes are contemplated which are suitable for various industry applications of the material.

In some embodiments of the methods to provide biocomposite of the instant disclosure, biocomposite is provided in which alginate is mixed with plant cells or algae (or a combination of the two) before their dehydration following the methods as described herein, in which plant cells, algae, and biomass from agricultural waste (or combinations or the three) are compressed inside a mold to obtain a condensed lamellar structure, the selected bio-materials are compressed at varying pressure to control their dehydration over time, optionally in addition to pressure, the selected bio-materials undergo temperature cycles to control their dehydration over time.

In some embodiments of the methods to provide biocomposite of the instant disclosure, biocomposite is provided in which chitosan is mixed with plant cells or algae (or a combination of the two) before their dehydration following the methods as described herein, in which plant cells, algae, and biomass from agricultural waste (or combinations or the three) are compressed inside a mold to obtain a condensed lamellar structure, the selected bio-materials are compressed at varying pressure to control their dehydration over time, optionally in addition to pressure, the selected bio-materials undergo temperature cycles to control their dehydration over time.

In some embodiments of the methods to provide biocomposite of the instant disclosure, biocomposite is provided in which pectin is mixed with plant cells or algae (or a combination of the two) before their dehydration following the methods as described herein, in which plant cells, algae, and biomass from agricultural waste (or combinations or the three) are compressed inside a mold to obtain a condensed lamellar structure, the selected bio-materials are compressed at varying pressure to control their dehydration over time, optionally in addition to pressure, the selected bio-materials undergo temperature cycles to control their dehydration over time.

In some embodiments of the methods to provide biocomposite of the instant disclosure, biocomposite is provided herein in which lignin is mixed with plant cells or algae (or a combination of the two) before their dehydration following the methods as described herein, in which plant cells, algae, and biomass from agricultural waste (or combinations or the three) are compressed inside a mold to obtain a condensed lamellar structure, the selected bio-materials are compressed at varying pressure to control their dehydration over time, optionally in addition to pressure, the selected bio-materials undergo temperature cycles to control their dehydration over time.

In some embodiments of the methods to provide biocomposite of the instant disclosure, biocomposite is provided in which cellulose is mixed with plant cells or algae (or a combination of the two) before their dehydration following the methods as described herein, in which plant cells, algae, and biomass from agricultural waste (or combinations or the three) are compressed inside a mold to obtain a condensed lamellar structure, the selected bio-materials are compressed at varying pressure to control their dehydration over time, optionally in addition to pressure, the selected bio-materials undergo temperature cycles to control their dehydration over time.

In general in biocomposite of the instant disclosure a hierarchical and anisotropic microstructure can be observed, in those comprised of pure cells and in those with additives. The compression process compacts the cells and gives rise to a lamellar architecture in the microscale. In all prepared biocomposites the compacted cells are aligned along the normal to the compression plane. In the nanoscale, at the sub-cellular level, a fibrillar multi-lamellated structure is also observed. In particular, after the compression the cellulose fibrils are aligned in the plane normal to compression.

In general in biocomposite of the instant disclosure, SEM images show that with the present approach almost no pores/air voids are observed. Therefore, fabrication method and resulting biocomposite of the instant disclosure porosity is reduced in order to improve mechanical properties, because that correlation is known to exist in all bulk materials between porosity and mechanical properties.

Plant cells, cultured plant cells, culture medium, biomass and a compression tools can be provided as part a system to provide a biocomposite herein described, the system comprising a cultured biomass comprising cultured plant and/or algae cells from a suspension culture having a water content of at least 10 wt %, and a compression tool.

In embodiments of the biocomposite fabrication system the mold is configured to interact with the cultured biomass in accordance with the fabrication methods herein described to provide a biocomposite material having water content of 0.1-15 wt %, a mass loss from the cultured biomass of 80-99% and/or a dry density of 500-1500 kg/m3.

As used herein, a "compression tool" indicates any mechanism that can apply controlled varying levels of compression to a sample and allow water to escape the sample (e.g. biocomposite panels). Examples include presses, such as hydraulic, pneumatic, mechanical (e.g. screw), and electromechanical (e.g. magnetically actuated) presses. The press can be a hot press which applies heat as well as pressure to the sample.

Figure 26:
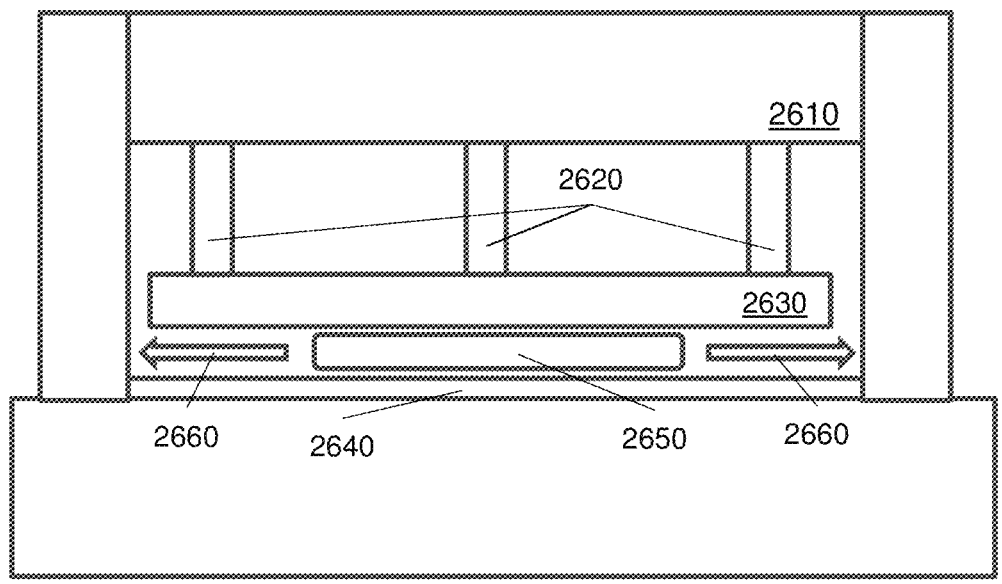
FIG. 26 shows a schematic representation of an exemplary biocomposite fabrication system of the instant disclosure.

An example of a compression tool used for compression and dehydration is shown in FIG. 26, in the form of a hydraulic hot press. A hydraulic actuator (2610) moves hydraulic pistons/rams (2620) to move a pressure plate (2630) to compress a sample (2650) against a bolster plate (2640). The pressure (controlled by the actuator (2610)) allows water to exit (2660) the sample. The pressure plate (2630) and/or bolster plate (2640) can be heated. The press can also be configured in other orientations, such as where the actuator, pistons, and pressure plate are below the sample and the pressure is applied upwards to a bolster plate above the sample. The sample can include a mold surrounding the material to be pressed, limiting lateral (with respect to the press plates) movement of the material. The press can include multiple plates stacked vertically such that multiple samples can be pressed at the same time. Those skilled in the art would understand the various press configurations known in the art.

In some embodiment, the compression tool is a compression mold. Preferably a compression mold is a porous more preferably an at least 5% porous mold, for example a 15% porous mold.

In some embodiments, biocomposites of the present disclosure and related, compositions, methods and systems, can be used to address major environmental concerns regarding composite materials include (i) sustainability of basic components, and (ii) recycling or degradation methods of the significant production-related waste as well as after-use waste (Mohanty et al., 2018; Huang et al., 2019). To date, the majority of the produced composite materials waste is disposed of in landfills or is incinerated. Therefore, the urgent need to develop advanced composite materials which combine biodegradability with sustainable main components has emerged.

In some embodiments, biocomposites of the present disclosure and related, compositions, methods and systems, can overcome challenges for the all-bio-derived composites such as balancing the production cost-performance relationships, improving durability and assessing the true environmental impact of manufacturing processing and post-use strategies (Mohanty et al., 2018).

In some embodiments, biocomposites of the present disclosure and related, compositions, methods and systems, can be used to provide sustainable renewable material with mechanical properties superior to biocomposite formed by yeast or mycelium with or without other components to create biocomposites which have mechanical performance characterized by elastic modulus <0.6 GPa, strength <10 MPa.

In some embodiments, biocomposites of the present disclosure and related, compositions, methods and systems, can be used to plan a sustainable future reducing the impact the environment taken in term of CO2 emissions that play a critical role in the rapid climate changes.

In some embodiments, biocomposites of the present disclosure and related, compositions, methods and systems, can be used to provide renewable resources with reduced lifecycle environmental impacts without need to rely on the use of polyolefin binders and matrixes, which are not biodegradable or rely on the pulp and paper industry.

In some embodiments, biocomposites of the present disclosure and related, compositions, methods and systems, can be used to produce wood and plastic substitutes using algae and agricultural waste. The biomaterials as disclosed are biodegradable and can be directly formed in thick layers or panels, without the need for binders or adhesives. These materials will have a significant impact on the environment since they will recycle and add value to waste material and sequester CO2 from the atmosphere during their production. To produce 1 kg of microalgae, 1.83 kg of CO2 is typically consumed. Algae can grow on land, which is unsuitable for agriculture and in wastewater, which would mitigate the need for expensive nutrients.

The biocomposites, methods and systems herein described are further illustrated in the following examples, which are provided by way of illustration and are not intended to be limiting.

EXAMPLES

The biocomposites, methods and systems herein described are further illustrated in the following examples, which are provided by way of illustration and are not intended to be limiting.

In particular, biocomposites from tobacco cells were prepared with a porous compression mold in accordance with an exemplary method of the present disclosure and the resulting biocomposites were tested for structural, compositional and mechanical properties.

A person skilled in the art will appreciate the applicability and the necessary modifications to adapt the features described in detail in the present section, to additional biocomposites and related compositions, methods and systems according to embodiments of the present disclosure.

In particular a skilled person will understand how to adapt the specific, materials, and methods used in the following examples to additional materials, and methods identifiable in view of the instant disclosure such as additional, plant cells, biomass, mediums, compression mold, fillers, culturing, compression and/or detection processes in accordance with the present disclosure.

The exemplary biocomposites, compositions, methods and systems exemplified in this section were prepared and analyzed using the following materials and methods.

Feedstock materials The natural wood materials tested were Red Oak (*Quercus rubra*), Black Walnut (*Juglans nigra*), Yellow Poplar (*Liriodendron tulipifera*) and Sugar Pine (*Pinus lambertiana*) and were kindly provided by Caltech resources. The engineered wood samples were hardwood plywood and medium density untempered hardboard (MDF) provided by Caltech resources. The commercial plastics were low-density polyethylene, LDPE (King Plastic Corp, North Port, FL.), SIS-030E high impact polystyrene, PS (Certene, Norwalk, CT) and Densetec Copolymer Polypropylene, PP (Polymer Industries, Henagar, AL).

Cell staining: Cells were stained for cellulose in a 1% solution of alcian blue in 3% acetic acid (MilliporeSigma, St. Louis, MO). The staining for pectin was performed using a 0.01% (v/v) ruthenium red solution in water, supplemented with 0.1% (v/v) ammonia (MilliporeSigma, St. Louis, MO). Safranin O in a 1% solution was used to stain phenolic compounds (MilliporeSigma, St. Louis, MO).

Microscopy Observations A Zeiss Axio Scope A1 (Zeiss, Oberkochen, Germany) was used for optical imaging of the untreated and stained cells. Two-photon analysis of the safranin-stained cells was performed in a Zeiss LSM 710 confocal laser scanning microscope (Zeiss, Oberkochen, Germany). Image acquisition was implemented with a LC C-Apochromat 40x/1.1 W Korr M27 objective, at an excitation wavelength of 488 nm and emission wavelength 606 nm.

Electron Microscopy SEM images were obtained using a FEI Nova 200 NanoLab Dualbeam FIB/SEM (FEI, Hillsboro OR, USA), operating at 2-30 kV and 10-50 pA.

Sample preparation for TEM Small pieces (~1-2 mm3) were shaved from a larger biocomposite sample using a #11 scalpel. The pieces were placed in a petri dish and fixed for 1 hour with 2% OsO4 in dH2O. The pieces were rinsed 3x with dH2O, dehydrated into acetone over 48 hours, then infiltrated with Epon-Araldite resin (Electron Microscopy Sciences, Port Washington PA) for 48 hours. Samples were placed in rubber embedding molds and the resin polymerized at 60° C. for 24 hours.

Semi-thick (400 nm) serial sections were cut with a UC6 ultramicrotome (Leica Microsystems, Wetzlar, Germany) using a diamond knife (Diatome US, Port Washington, PA). Sections were placed on Formvar-coated copper-rhodium 1 mm slot grids (Electron Microscopy Sciences) and stained with 3% aqueous uranyl acetate and lead citrate. Colloidal gold beads (10 nm) were placed on both sides of the section to serve as fiducial markers for subsequent image alignment.

Grids were placed in a dual-axis tomography holder (Model 2040, E.A. Fischione Instruments, Inc., Export, PA) and imaged with a TF-30ST electron microscope (ThermoFisher Scientific, Waltham, MA) at 300K eV. Images were recorded with US1000 camera (Gatan, Inc.). Montaged projection images and tomographic tilt-series were acquired automatically using the SerialEM software package (41). Briefly, grids were tilted +/−64° and images acquired at 1° intervals. The grid was then rotated 90° and a second tilt series was taken about the orthogonal axis. Tomographic data were calculated, analyzed and modeled using the IMOD software package (42). 3D reconstructions of selected areas were created using the isosurface function of IMOD with the following parameters: threshold at 133, outer limit 21, X 790, Y 1451, Z 143, X size 152, Y size 152, Z size 55, binning 1, smoothing 1, delete small pieces<100.

Raman Spectroscopy Raman spectra were collected with a Renishaw inVia Raman microprobe (Renishaw, Wotton-under-Edge, United Kingdom) equipped with a Leica DM 2500 M microscope (Leica Microsystems, Wetzlar, Germany), an Olympus LM Plan FL 20x long working distance objective (numerical aperture=0.4) (Olympus, Tokyo, Japan), a 1200 lines mm-1 grating, and a CCD detector configured in a 180° backscatter geometry. A 532 nm diode-pumped solid-state (DPSS) laser (Renishaw RL532C50) was used as the excitation source and a 30 mW radiant flux was incident on the surface of the sample. A λ/4 plate was used to circularly polarize the incident excitation. No polarizing collection optics were used.

Spectra of cells suspended in growth media, and reference spectra of pure water-based growth media were collected. The hydrogen bonding broad peak at 3300-3400 $cm^{-1}$ is observed in both cases, but in the case of suspended cells the intensity is over 2.5 times higher, indicating the presence of hydrogen bonding interactions between cellulose fibers.

Thermal Analysis Thermogravimetric analysis measurements were conducted in a D550 TGA from TA Instruments (New Castle, DE). Samples were heated from room temperature to 1000° C. at a heating rate of 1° C./min in N2 flow at 40 ml/min.

X-ray Diffraction (XRD) X-Ray diffraction patterns were collected using PANalytical X'Pert Pro (operating voltage at 40 kV, current at 40 mA, CuKα, λ=0.1541 nm). An angular range of 2θ=10–60° with a step size of 0.1° and a scanning speed of 0.008° $s^{-1}$ was used for the measurements (Panalytical B.V., Holland).

Chemical Analyses Compositional analysis was carried out using the anthrone-sulfuric acid colorimetric method for cellulose, acidic hydrolysis for hemicellulose, the carbazole colorimetric method for pectin and the klason method for lignin.

Electrical properties Copper tape was used for the electrodes, connected to a Keithley 2636B source (Tektronix, Inc. Beaverton, OR). Voltage scans between −2 and 2 V, with a 0.1 V/sec step were recorded. The slope of the obtained IV curves was converted to conductivity when multiplied with sample height and divided by cross-sectional area.

Water uptake-methods Water uptake and thickness swelling tests were performed according to ASTM D1037 with appropriate modifications (15). Ten (10) dry samples in dimensions of approximately 4×4×1.5 mm were immersed in 5 mL of distilled water, and their relative mass and thickness increase were measured after 2 or 24 hours in the distilled water, after 10 minutes of drying in air.

Mechanical properties 3-point bending and tension tests 3-point bending and tension tests were performed in an eXpert 8612 axial-torsion tester (Admet Norwood, MA), an Instron 5500 (Norwood, MA) and an Instron E3000 (Norwood, MA) equipped with 250 N, 500 N, 25 kN and 50 kN load cells. The biocomposite samples were tested with the 250 N (for tensile tests) and 500 N load cells (for bending tests). The larger load cells were used for reference materials, namely plastics (to accommodate larger tensile deformations) and wood samples of larger dimensions.

Figure 20:
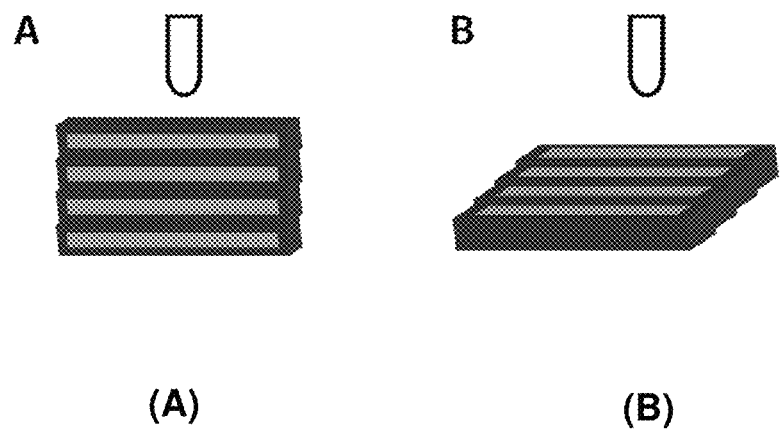
FIG. 20 shows that the biocomposites samples were subjected to 3-point bending tests in two perpendicular directions: panel (A) in plane with the cells lamellar arrangement and panel (B) normal to the cells stacking plane.

Mechanical properties-Flexural tests For the flexural tests, a minimum of five samples of each material were tested at a constant strain rate of 0.004±0.001 s−1 until failure. The support span was approximately 30 mm for the biocomposite samples. Samples of approximately 40×5×5 mm (length×width×thickness) dimensions were tested in two perpendicular directions, as shown in FIG. 20. Natural wood samples were cut in 35×7×4 mm strips, and plastic samples were cut at 75×7×4 mm strips. All reference materials were tested at the same strain rate as the biocomposites.

Mechanical properties-tensile tests For the tensile tests a minimum of five samples were tested at a constant strain rate of 0.0025±0.0001 s−1 until failure. Medium-density fiberboard end-tabs with dimensions 10×10×3 mm in all 40×5×5 mm specimens were applied, using a thin layer of polyvinyl acetate adhesive (Gorilla Wood Glue, Cincinnati, Ohio) (43). The natural wood tension samples, with dimensions approximately 100×15×5 mm, and the plastic samples in a dog-bone configuration of 115×1.5×6 mm (ASTM D638, type IV), were tested at the same strain rate as the biocomposites.

Mechanical properties—compression tests For the compression tests of the biocomposite samples, approximately 9×9×2 mm (length×width×thickness) samples were tested under compression at a constant rate of 0.001 s−1 to a 10% target strain. The compressive modulus was calculated from the linear part of the unloading stress-strain curve, while the maximum stress value during compression, corresponding to the 10% strain, was referred to as compressive strength.

Example 1: Cell Cultures

*Nicotiana tabacum* L. cv. Bright Yellow 2 (BY-2) cells were purchased from DSMZ. Cells were kept in Linsmaier & Skoog medium with vitamins (HIMEDIA-PT040) with 3% (w/v) sucrose at a pH of 5.8. The following supplements were added: 1 µM 2,4-dichlorophenoxyacetic acid (2,4-D), 1 µM a-naphtaleneacetic acid, and 1.46 mM KH2PO4. The cells were grown in 50-300 ml aliquots in 100 ml-1 L Flasks on a rotary shaker (130 rpm) at room temperature and were subcultured biweekly at 1:10-1:60 dilutions.

Alternatively, Tobacco (*Nicotiana tabacum*) BY-2 (Bright Yellow-2) cells (Nagata et al. 1992) were cultured in Murashige and Skoog (1962) medium, pH 5.8, with the following supplements: 0.9 µM 2,4-dichlorophenoxyacetic acid (2,4-D), 3% (w/v) sucrose, 3 µM thiamine-HCl, and 2.7 mM KH2PO4. The cells were grown in 50 mL aliquots in 300 mL Erlenmeyer flasks on a rotary shaker (100 rpm) at 25° C., in the dark, and subcultured weekly by transferring 1.5 mL of the culture into 50 mL of fresh medium.

Example 2: Structure of Plant Cell Wall

The cell wall in living plant cells extracted from suspension cultures according to Example 1 was characterized by optical laser microscopy and by Raman analysis as indicated in the materials and methods. In particular, confocal Raman spectroscopy was performed on suspensions of living cells to evaluate the chemical composition of the cell walls.

Figure 2:
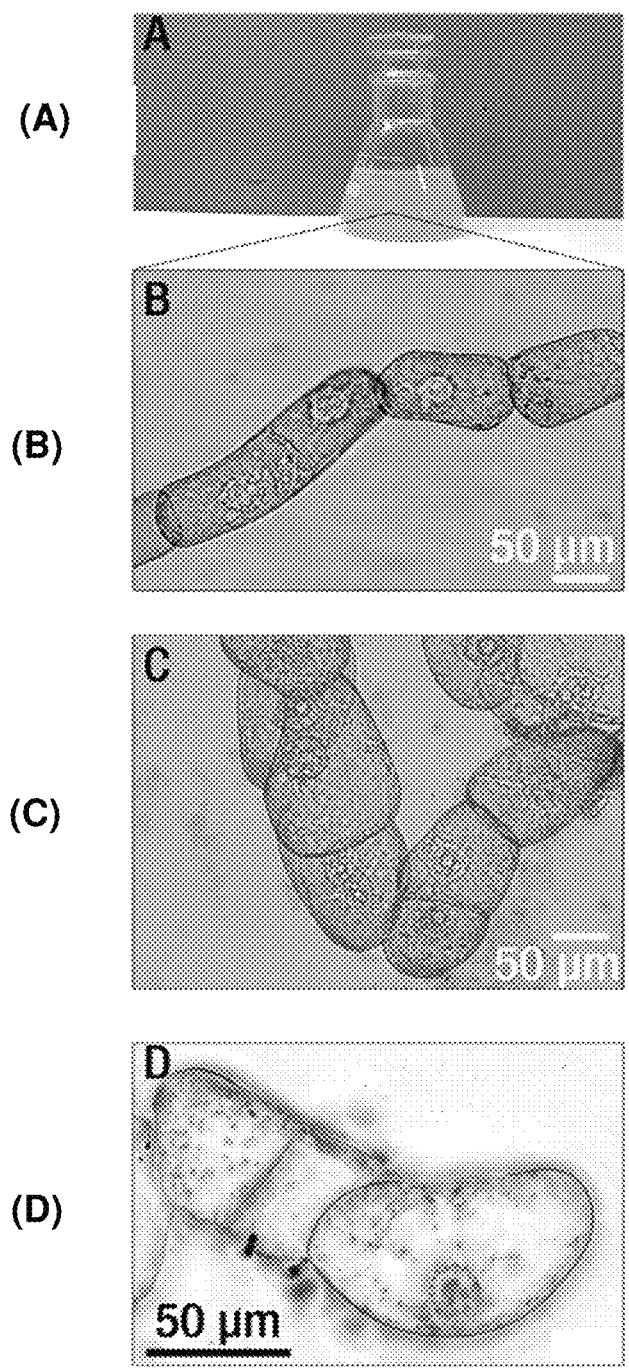
FIG. 2 shows panel (A) photograph of the cell culture. Microscopy images of the cells stained for panel (B) pectins, panel (C) cellulose, and panel (D) lignols.
Figure 3:
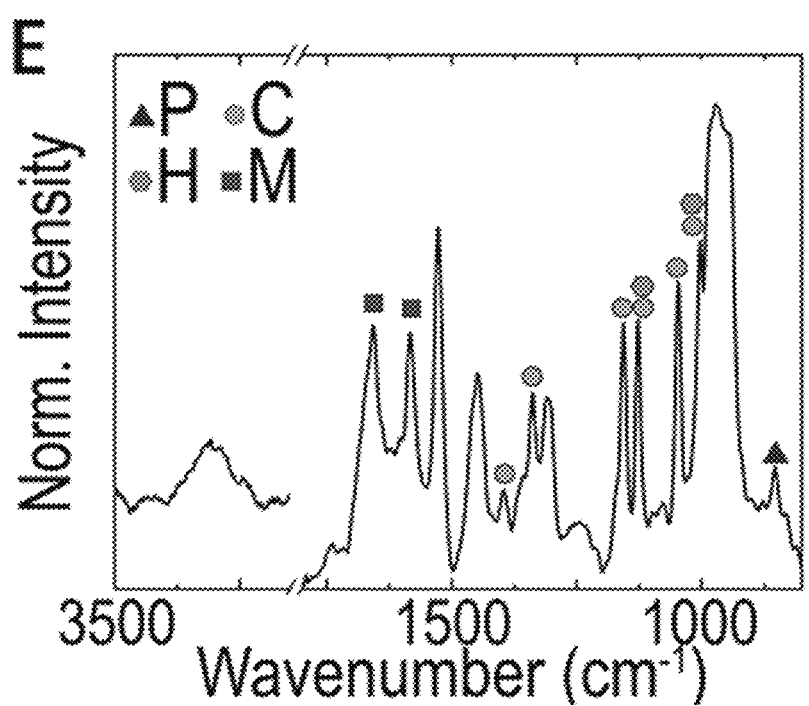
FIG. 3 shows Raman spectrum of plant cells; peaks assigned to pectin (P), cellulose (C), hemicellulose (H) and monolignols (M).

The results are illustrated in FIG. 2 (optical and laser microscopy) and FIG. 3 (confocal Raman spectroscopy).

In particular, the optical and laser microscopy results reported in the illustration of FIG. 2, show that viable cells are elongated, with a mean length of 170±60 µm, a mean width of 45±10 µm, and are surrounded by a thin primary cell wall containing cellulose, pectin and phenolic compounds (FIG. 2 Panels B-D).

Raman spectroscopy of living cells (FIG. 3) reveals the predominant vibrations of cellulose, hemicelluloses, pectin, and the lignin precursors coniferyl alcohol and coniferaldehyde (23, 24).

In particular the predominant carbohydrate vibrations detected thro through Raman spectroscopy and shown in FIG. 3 were assigned to cellulose and hemicelluloses including the peaks at 1003 and 1127 $cm^{-1}$, corresponding to C—C and C—O stretch modes (25, 45, 46). The peaks 1095, 1157 and 1338 $cm^{-1}$ are assigned to C—C and C—O vibrations in cellulose (25, 47). The skeletal vibrations of alpha-anomers of pectin give rise to the peak at 854 cm-1 (23). The 1584 cm-1 peak is attributed to C═C aromatic symmetric stretch vibrations, while the 1657 cm-1 is related to C═C symmetric stretch of coniferyl alcohol and C═O stretch of coniferaldehyde (23, 48). Therefore, the two latter peaks highlight the presence of monolignols, which are known lignin precursors, in the plant cell wall (24).

Additionally, in the illustration of FIG. 3 the hydrogen bonding region is evident from the peak around 3300 cm-1, which is related to the vibrations of both the inter- and intra-chain hydroxyl groups (25). In order to bind together neighboring cells, the self-adhesive properties of cellulose nanofibers (26) was utilized.

As demonstrated in all-cellulose materials, the native hydrogen bonding along with van der Waals interactions provide adhesion between nanocellulose fibrils, thereby eliminating the need for an external adhesive binder (27).

Example 3: Biocomposite Fabrication

Living cells cultured as described in Example 1 were used to provide a biocomposite according to an exemplary embodiment of the method of the instant disclosure.

The living cells were harvested from the cell culture. If cells are to be extracted from a suspension culture, the cultured biomass is a vacuum filtered (e.g. in an Erlenmeyer flask), to remove water and growth media from the biomass and separate the plant biomass from growth media. For solid culture vacuuming is not required. The collected biomass is typically weighed.

If addition of fillers or other additives is desired, such addition is performed typically after separation of the plant biomass from the cultured biomass. Mixing of the additives with the plant biomass can be typically performed either manual or with assistive equipment (e.g. stirrer, and ultra-sonication) to homogenize the mixture.

If control of water content is needed or desired, the plant biomass can be dried typically following weighing and/or the optional additives addition. Oven drying at temperatures below 100° C. for the duration can be performed to reach the water loss desired. Biomass or hybrid mixture including biomass and additives can typically have the form of solid cell cluster can then be collected and transferred into the mold.

The collected biomass can be placed in particular on porous aluminum custom designed molds (Metapor Aluminum, Attleboro, MA) and subjected to a controlled compression.

Calibration of the pressure rate dictates the appropriate compression protocol. In the case of tobacco cells and their composites a pressure can be used of 0.1±0.05 MPa/day till 0.8 MPa to compact the dehydrating cells until they reaches a 15±5 wt % solid residual mass (typically within 5-7 days days). The samples were held at the maximum pressure (0.8 MPa) typically for 2 days until a solid residual mass 10±5 wt % is reached. All samples were subsequently dried for 48 h at 60° C. in a benchtop oven to reach a final dry solid residual mass of 2±1 wt % (Heratherm, Thermo Scientific, Waltham, MA).

Material is extracted from the mold after a mass loss of more that 50% is achieved, and dried for a minimum of 12 h at a temperature below 100° C.

The residual water after the fabrication process was 7±3 wt % as determined from TGA measurements of the dried samples.

Each sample density was calculated from the ratio of their mass (analytical balance XS205, Mettler Toledo, Columbus, Ohio) divided by their volume. In particular, a cultured biomass was extracted from a culture according to Example 1 in a hydrated state (water content 10 wt % or higher).

Example 4: SEM Imaging of Biocomposite Material

The structure of biocomposite materials obtained with the method exemplified in Example 3 from undifferentiated *Nicotiana* tobacco BY-2 cells was imaged with cross-section scanning electron microscopy (SEM).

Figure 4:
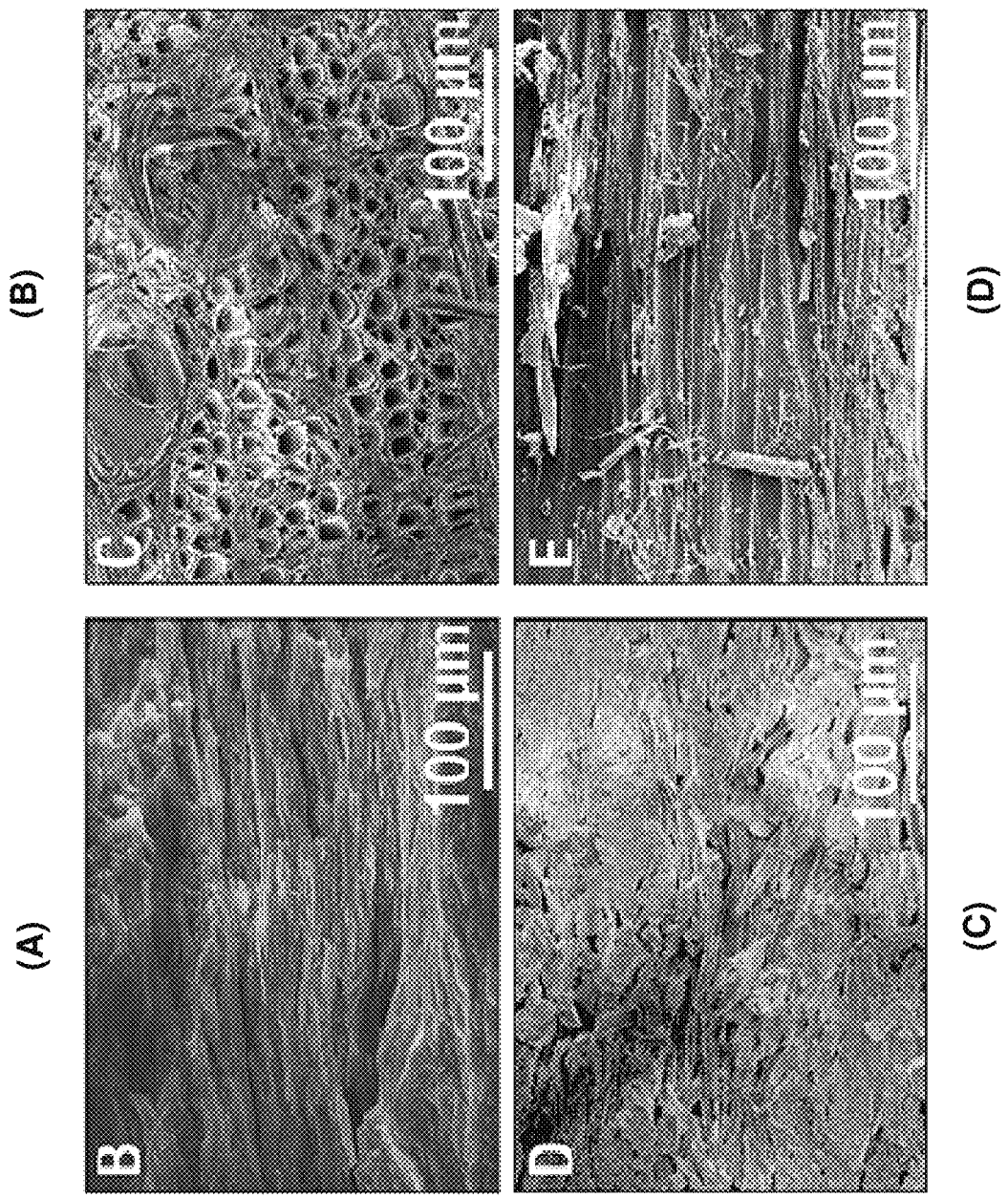
FIG. 4 shows SEM cross-sectional views of the microstructure of an exemplary biocomposite of the present disclosure (Panel A) compared with microstructure of walnut (Panel B), MDF (Panel C) and plywood (Panel D) at the same magnification.
Figure 5:
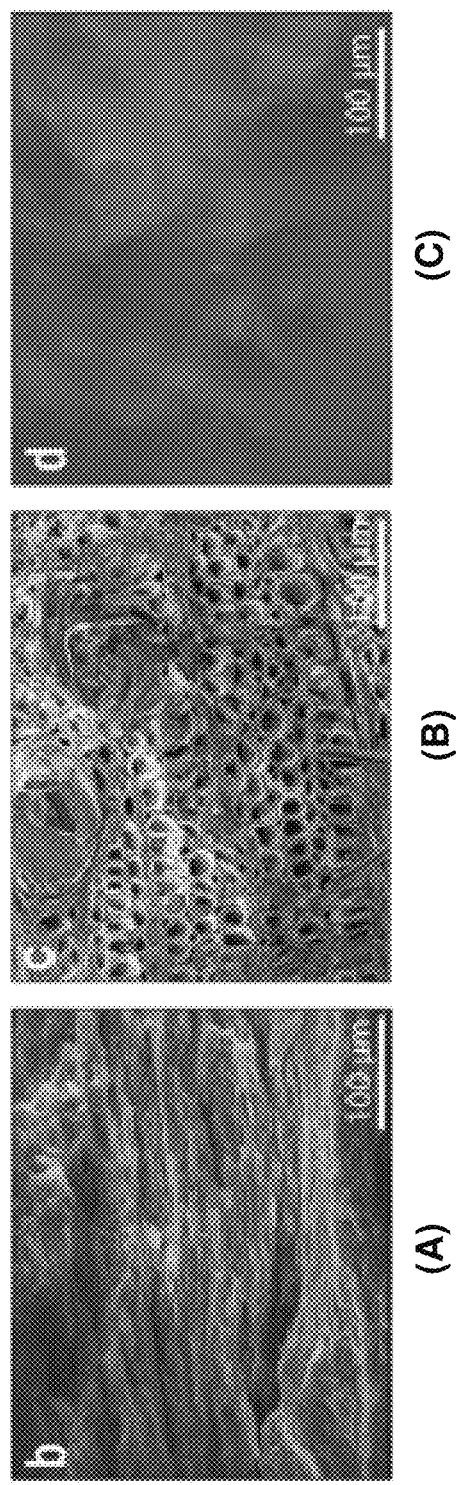
FIG. 5 shows SEM cross-section views of an exemplary bio-composite (Panel A), walnut panel (B) and PP panel (C) at the same magnification, showing the different microstructures of these materials.

The related SEM images are shown in FIG. 4 and FIG. 5 in comparison with SEM images of other material taken at the same magnification.

In particular, FIG. 4 Panel A) illustrates the obtained microstructure of a biocomposite obtained starting from undifferentiated *Nicotiana* tobacco BY-2 cells. It consists of a layered structure of compacted cells. The adjacent cells are in cotact and appear interconnected with each other, and cannot be distinguished as separate entities by SEM imaging. Also the cell walls cannot be distinguished by SEM.

The structure of the biocomposite material was compared to natural wood (walnut, FIG. 4 Panel B), commercial medium density fiberboard (MDF, FIG. 4 Panel C), and plywood (FIG. 4 Panel D).

From the comparison the biocomposite material obtained appears structurally similar to plywood and MFD, which are compressed wood composites bound together with polymer adhesives.

However natural wood has a cellular structure with pores and a distinct architecture which differentiates it with the pore-less compacted biocomposites prepared here. MDF and plywood SEM images are more similar to the biocomposites, because they are also compacted structures. However, they do not have the distinct lamellar binder-less microstructure we see in our biocomposites. They rather have a glued-wood fiber structure (FIG. 4C) or a "continuum-phase" of wood plies glued together (FIG. 4D). In our biocomposites the collapsed cells are not distinguishable but the microstructure is not as homogeneous as in the other two cases where the biomass is glued together.

This is also confirmed by the illustration of Figure FIG. 5, panel (A) which demonstrate the lamellar and dense microstructure thus obtained from the compacted plant cells which has a material density of 1.1±0.1 g/cm$^3$.

Natural wood (for example walnut, FIG. 5, panel (B)) has a complex cellular microstructure with porosity that varies across the grain direction, while plastics (polypropylene presented in FIG. 5, panel (C)) have a continuous un-structured appearance. Fibers and/or particles from agricultural waste or alternative biomass can be added before compression in order to obtained biocomposite materials.

Example 5: Optical SEM and TEM Images of Biocomposite Material

An exemplary biocomposite obtained according to the procedure exemplified in Example 3, was obtained and the related structure observed optically, trough SEM imaging and TEM imaging techniques indicated in the materials and methods. The results are shown in FIG. 6 and FIG. 7.

Figure 6:
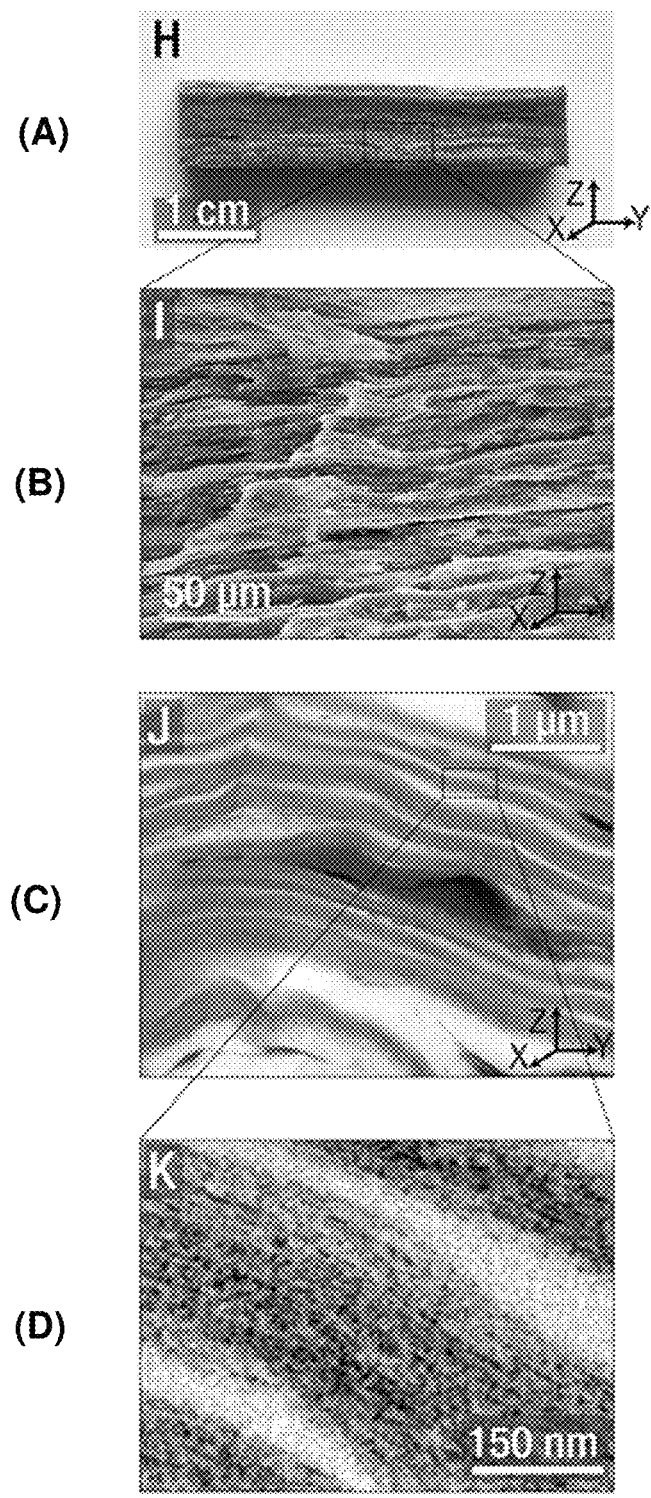
FIG. 6 shows panel (A) photograph of an exemplary biocomposite sample, panel (B) SEM image of a cross-section, demonstrating the lamellar micro-structure, panel (C) TEM and panel (D) HRTEM images of the biocomposite cross-sections.
Figure 7:
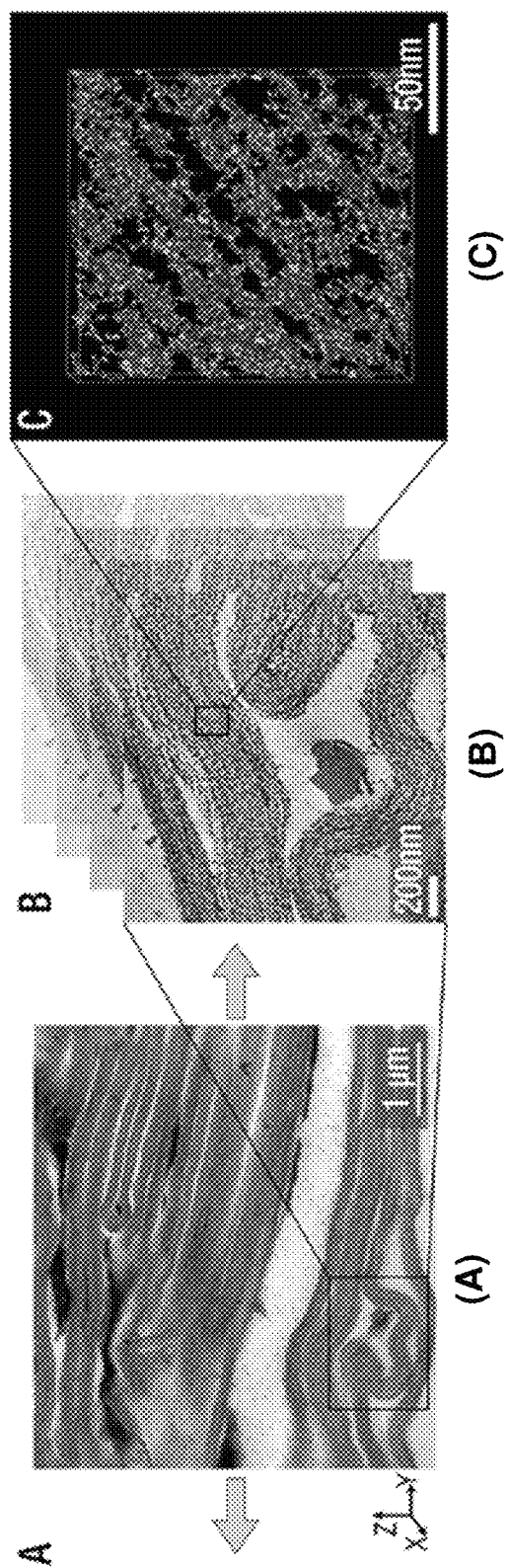
FIG. 7 shows panel (A) TEM of a cross-sectional area of an exemplary biocomposite according to the present disclosure. Gray arrows indicate the testing direction for tensile experiments, panel (B) selected subsection for tomography imaging, panel (C) 3D reconstruction of selected cell wall subsection. Gold corresponds to dark pixels in the TEM, showing how the cell wall material is distributed in the selected area.

Optical and SEM observations of the biocomposite panels reveal an anisotropic, dense, lamellar microstructure comprised of compacted plant cells (FIG. 6 Panels A-B). Transmission electron microscopy (TEM) demonstrates that the primary cell walls are preserved during cell compression and dehydration (FIG. 6 Panels C-D).

Accepted models suggest that the primary cell wall is a multi-lamellated structure consisting of cellulose microfibrils, arranged in various orientations within each plane (from entirely isotropic to somewhat aligned, depending on cell type), bound in a matrix of hemicelluloses and pectins (30).

Even in the case of randomly distributed cellulose microfibrils in the plane of the wall, the structure is considered highly anisotropic across thickness (30). TEM images of herein described exemplary biocomposites show an average dehydrated cell wall thickness of 185±57 nm, and cellulose microfibrils diameters ranging between 1 and 30 nm.

High resolution TEM (HRTEM) images confirm the presence of multi-lamellated structures, with cellulose microfibrils laying across the consecutive parallel planes (FIG. 6 Panel D, FIG. 7 Panels A-B). Using 3D tomographic reconstructions, the spatial distribution of the cell wall components was analyzed, and their fibrous organization across multiple parallel planes, resulting in a highly anisotropic network (FIG. 7 Panel C) was observed.

A hierarchical microstructure was observed: at the cellular level, a lamellar architecture consisting of compacted cells (FIG. 6 Panel B); at the sub-cellular level, an anisotropic, multi-lamellated structure, derived from the natural organization of the cell wall components (FIG. 6 Panels C-D, FIG. 7 Panels B-C).

Example 6: TGA Analysis of Biocomposite Material

A compositional analysis of the dry material obtained according to the procedures exemplified in Example 3 was performed by thermal gravimetric analysis (TGA) with the materials and method described. The results are shown in FIG. 8.

TGA curves of the biocomposite reveal four distinct mass loss steps (FIG. 8) as shown in regions I-IV. The first derivative of mass loss TGA curve (DTG) peaks correspond to: evaporation of bound water (peak 1), and degradation of pectins (peak 2), hemicelluloses (peak 3), cellulose (peak 4), and phenolic compounds (peak 5-6) (28). The char residue is 10±5 wt %.

Figure 8:
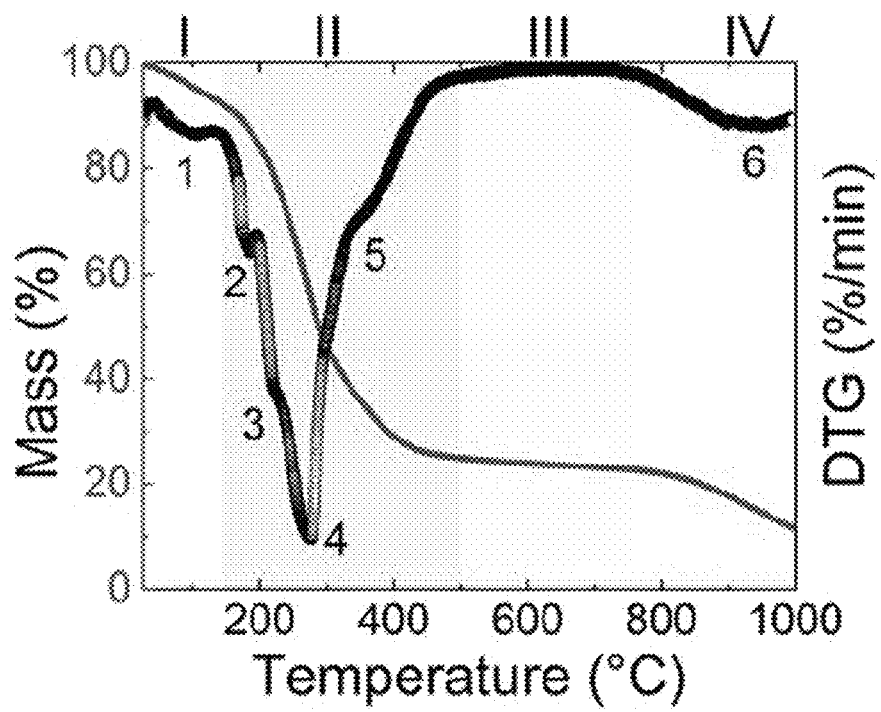
FIG. 8 shows TGA (thinner solid line) and DTG (numerically annotated thicker dotted line) plots of the dehydrated biocomposite.

The results shown in FIG. 8 indicate that the dry material is composed of 15% cellulose, 20% hemicelluloses, 6.8% pectins and 6.3% lignols. Thus, the obtained material is a biocomposite, comprised of a heterogeneous mixture of naturally synthesized biopolymers.

Before all testing, all samples were subjected to a 48 hours dehydration in 60° C. TG analysis reveals that even after the extensive drying process, there is water remaining in AW samples (7±3 wt %), as shown by the initial mass loss step from 50 to 130° C. (peak 1, region I). The main mass loss step occurs between 130-500° C. (region II) followed by a monotonous smaller mass loss (region III) and a final mass loss at a higher rate above 800° C. (region IV). The amorphous pectins and hemicelluloses decomposition is initiated at lower temperatures than the higher molecular weight components (Mendu et al., 2011; Meng et al., 2015).

In biocomposites AW, the first DTG peak around 180° C. corresponds to pectins degradation, while hemicelluloses, cellulose and lignols decomposition yield the peaks around 215, 275, and 350 respectively (Gasparovic, Korenova and Jelemensky, 2010; Mendu et al., 2011; Meng et al., 2015). Phenolic compounds have the highest thermal stability and decompose slower than the rest of the components often at temperatures between 800-900° C., as observed in the AW samples (region IV) (Meng et al., 2015).

Example 7: XRD Analysis of Biocomposite Material

From XRD patterns of biocomposites prepared according to the procedure exemplified in Example 3 were detected. The results are shown in FIG. 9.

Figure 9:
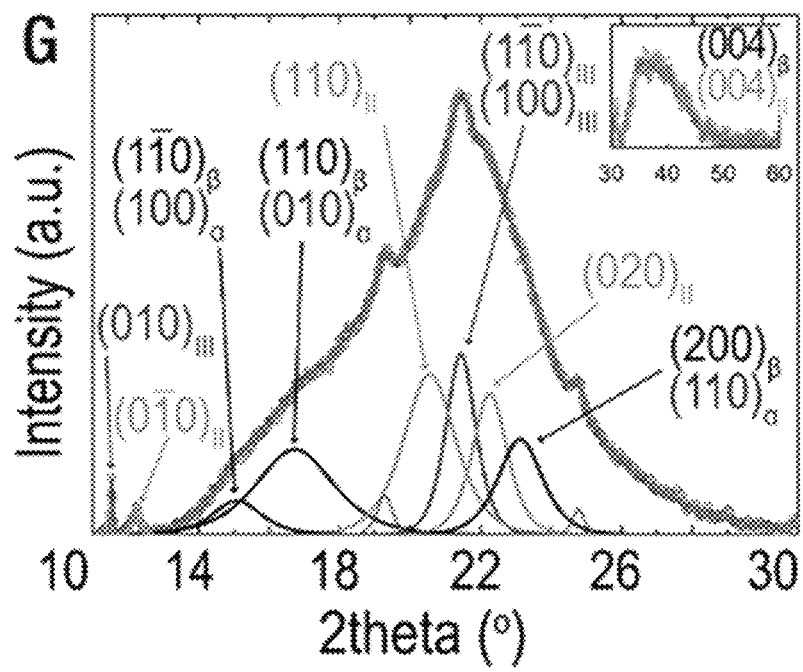
FIG. 9 shows XRD pattern with marked contributions from cellulose polymorphs Iα, Iβ, II and III.

The analysis of the diffraction patterns shown in FIG. 9, reveals that cellulose exists in multiple crystal polymorphs (I, II and III, marked in FIG. 9) (29, 49, 50). The main diffraction peaks from native cellulose, Iα and Iβ, correspond to (110) and (200) crystallographic planes respectively, and contribute to the broad 22-23° peak.

The shoulders at 15° and 17° respectively are assigned to Iα and Iβ diffractions from the (100), (010) and (1-10), (110) planes (27). Distinct contributions from cellulose II include the (110) peak at 19.9° and the (1-10) peak at 12.2°. Cellulose III diffractions from the (1-10), (100) and (010) planes give rise to the peaks at 20.9°, 20.6° and 11.6° respectively (29).

Additionally, polysaccharide derivatives of mannose and galactose, which are backbone constituents of hemicellulose, give rise to the peaks at 19.1° and 24.8° (51, 52).

Accordingly, the presence of semicrystalline cellulose is confirmed by the exemplary XRD of FIG. 9.

Example 8: Density of Biocomposite Materials\

Figure 10:
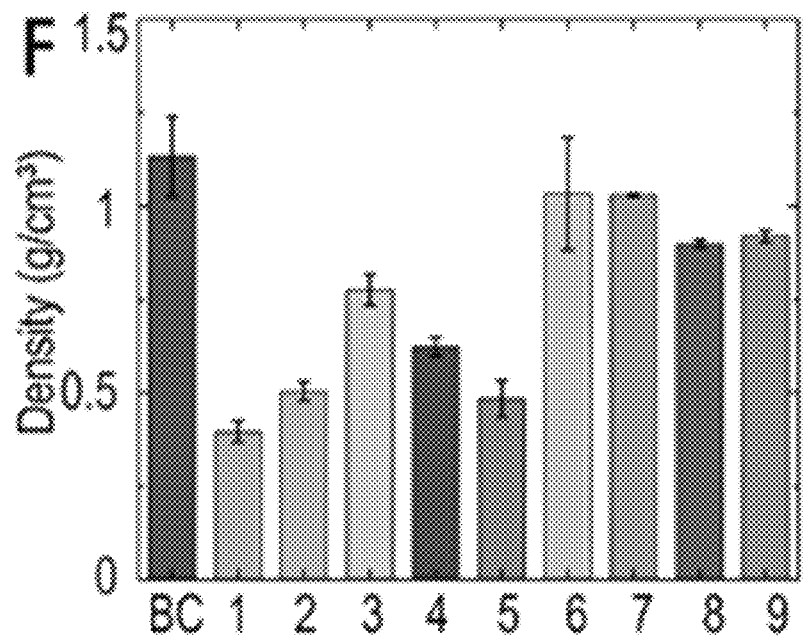
FIG. 10 shows density of the biocomposite and reference materials. Samples notation: BC: pure (without fillers) bio-composite; 1: pine; 2: poplar; 3: oak; 4: walnut; 5: plywood; 6: MDF; 7: PS; 8: PP; 9: LDPE.

The density of a biocomposite prepared according to the procedure exemplified in Example 3, was tested for density according to the techniques indicated in the material and methods above. The related results are shown in FIG. 10.

Figure 12:
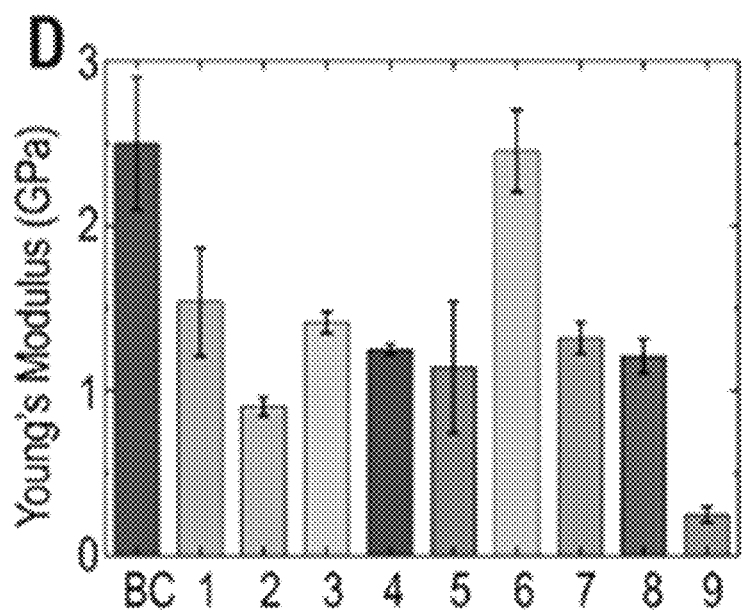
FIG. 12 shows Young's modulus of the biocomposite and reference materials. Samples notation: BC: pure (without fillers) bio-composite; 1: pine; 2: poplar; 3: oak; 4: walnut; 5: plywood; 6: MDF; 7: PS; 8: PP; 9: LDPE.
Figure 13:
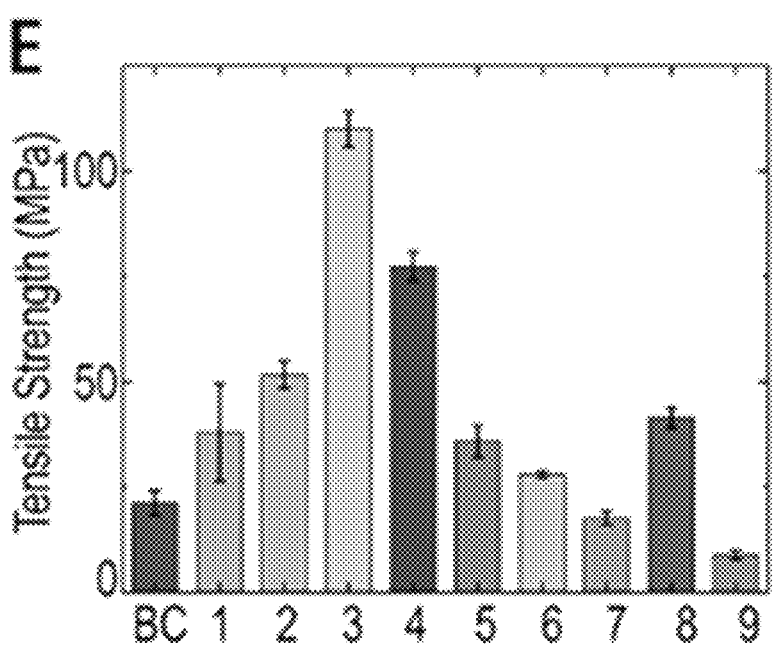
FIG. 13 shows tensile strength of the biocomposite and reference materials. Samples notation: BC: pure (without fillers) bio-composite; 1: pine; 2: poplar; 3: oak; 4: walnut; 5: plywood; 6: MDF; 7: PS; 8: PP; 9: LDPE.
Figure 14:
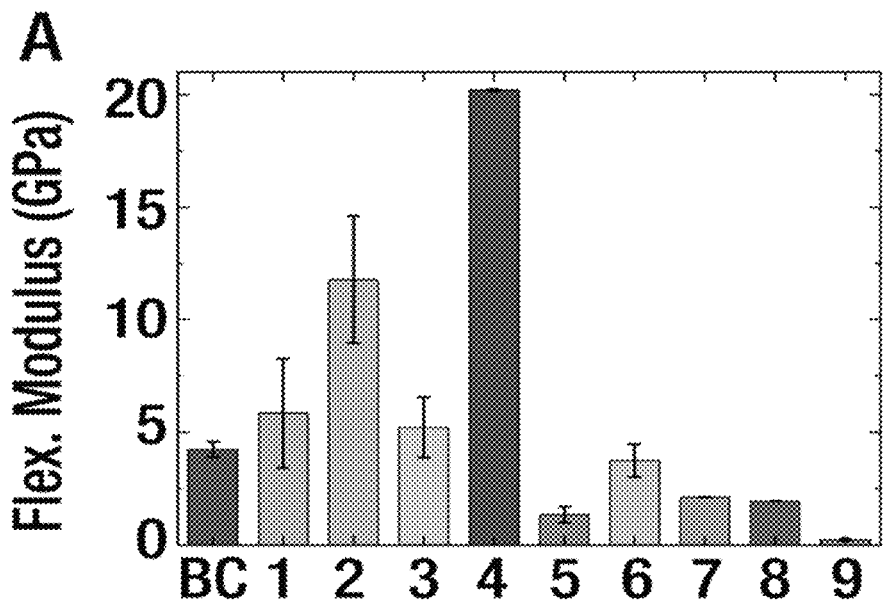
FIG. 14 shows flexural modulus calculated from 3-point bending experiments. Samples notation: BC: pure biocomposite material; 1: pine; 2: poplar; 3: oak; 4: walnut; 5: plywood; 6: MDF; 7: PS; 8: PP; 9: LDPE.
Figure 15:
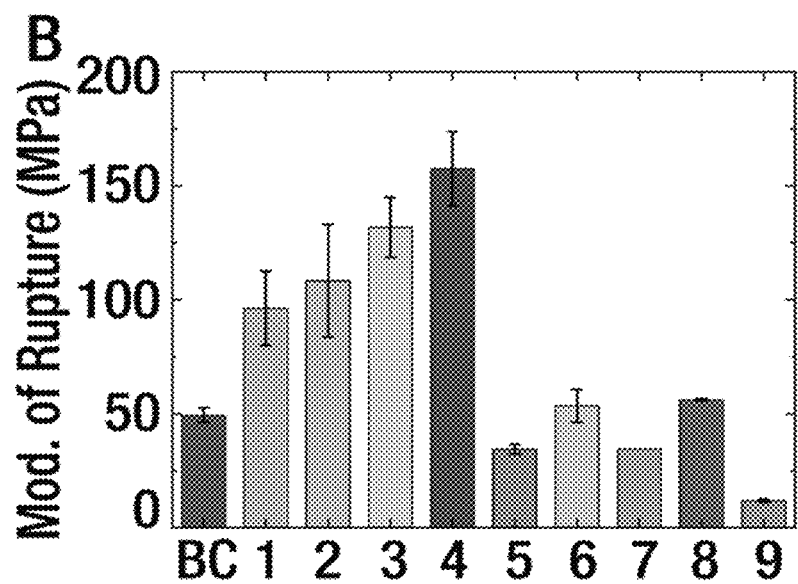
FIG. 15 shows modulus of rupture calculated from 3-point bending experiments. Samples notation: BC: pure biocomposites material; 1: pine; 2: poplar; 3: oak; 4: walnut; 5: plywood; 6: MDF; 7: PS; 8: PP; 9: LDPE.

In particular the results illustrated in FIG. 12 shows density of the biocomposite and reference materials. Samples notation: BC: pure (without fillers) bio-composite; 1: pine; 2: poplar; 3: oak; 4: walnut; 5: plywood; 6: MDF; 7: PS; 8: PP; 9: LDPE.

Example 9: Biodegradation of Biocomposite Materials

Biodegradability of the biocomposites prepared with a procedure according to the indications of the exemplary procedure reported in Example 3, was characterized as indicated in the materials and methods in comparison with pine natural wood.

In particular, a rectangular shaped pieces of 0.05±0.01 grams of the was incubated in agricultural soil (FoxFarm Ocean Forest Potting Soil). Each pot was stored in at outdoors location for 14 weeks. The biocomposites and natural wood control samples were recovered every 2 weeks to measure their residual mass. Following literature reported process (44), the samples were recovered, cleaned and dried at room temperature and subsequently weighed. The mass loss of the biocomposite was compared with that of natural wood (36).

Figure 11:
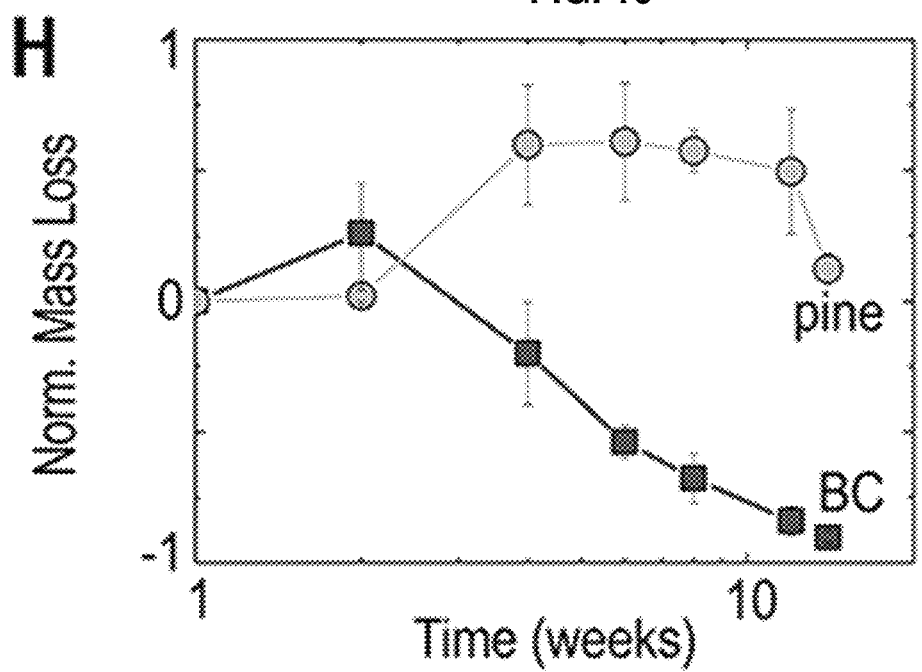
FIG. 11 shows biodegradation of the biocomposite (BC, in square) and natural pine (in circle).

The results are illustrated in FIG. 11 and show an initial mass gain corresponding to water uptake from the soil, in both natural wood and biocomposites (FIG. 11).

The detectable mass loss due to biodegradation of the biocomposites begins 3 weeks after incubation, while for natural wood it begins about 7 weeks later. This can be associated to the presence of lignin in natural wood, which provides resistance to pathogen attacks on cell walls (37). An almost complete biodegradation of the biocomposite was observed 14 weeks after initial incubation. A potential drawback of rapid biodegradation is water sensitivity.

Example 10: Mechanical Properties of Biocomposite Materials

Biocomposite materials obtained with the procedures exemplified in Example 3 were tested for mechanical properties in accordance with the procedures indicated in the material and methods of this section.

Tensile and 3-point bending tests were performed to characterize the mechanical performance of the dehydrated biocomposites.

Figure 16:
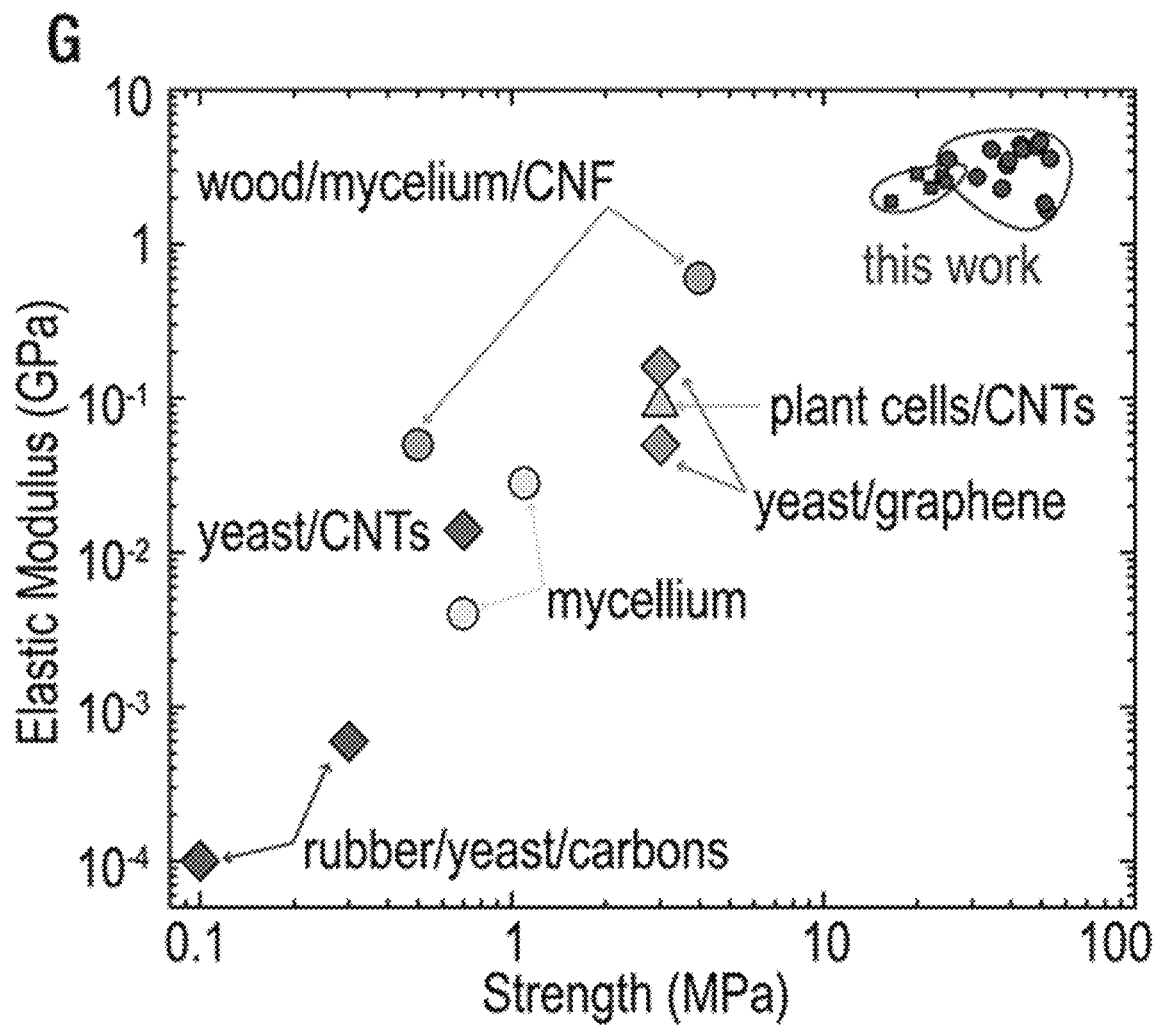
FIG. 16 shows a comparison of mechanical properties of this work (encircled points above annotation 'this work'), and literature-reported biocomposites from living, eukaryotic organisms (9, 10, 15, 31, 34, 35).

The mechanical properties of different woods and plastics were compared. IN particular, the dehydrated biocomposites were compared to different softwoods (pine), hardwoods (poplar, oak, and walnut), commercial plywood and MDF, and synthetic plastics of similar density (polystyrene, PS, polypropylene, PP, and low-density polyethylene, LDPE) (FIGS. 12-13, FIGS. 14-15) and with literature-reported biocomposites from living, eukaryotic organisms (FIG. 16).

Tension tests show that herein described exemplary biocomposites are stiffer than the other materials (FIG. 12).

However, natural woods have higher strength (FIG. 13), which can be explained by their different cellular architectures, cell wall compositions, and components arrangements within the secondary cell walls. The cells used in herein described exemplary biocomposites originate from the herbaceous plant *Nicotiana tabacum* and they naturally develop a thin, unlignified primary cell wall (only a low monolignol amount of 6.2 wt % was detected). These cells do not form secondary cell walls and cannot self-organize in a hierarchical micro-structure in herein described exemplary cultures. Regardless, the mechanical performance of herein described exemplary biocomposites is comparable to that of commercial engineered woods and plastics. They surpass all literature-reported values for materials composed of plant cells, mycelium, or yeast matrixes (9, 10, 15, 31-33) (FIG. 16).

Figure 17:
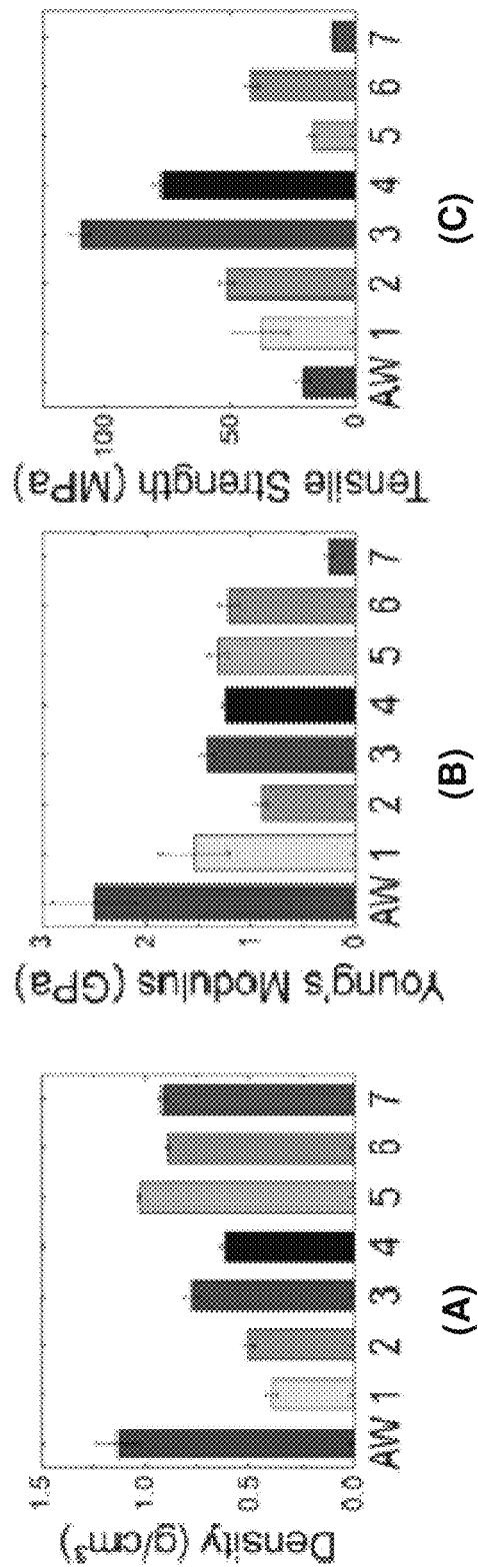
FIG. 17 shows materials properties for a biocomposite (labeled AW) produced from *Nicotiana tobacco* BY-2 cells: panel (A) materials density, panel (B) Young's modulus, and panel (C) tensile strength. Samples notation: 1: pine; 2: poplar; 3: oak; 4: walnut; 5: polystyrene; 6: polypropylene; 7: polyethylene.

Tension tests of several types of natural woods and plastics show that the Young's modulus of AW is 38-64% higher than the tested natural woods and 47-90% higher than the tested plastics (FIG. 17 Panel B). In terms of tensile strength, AW outperforms PS and LOPE, by 17 and 58% respectively, while PP has an almost double strength compared to AW (FIG. 17 Panel C). Natural woods have considerably higher tensile strengths compared to AW, with values ranging between 35-110 MPa for the different tested species. Flexural tests show that AW (along the thickness direction) has a higher modulus than the tested plastics as disclosed herein. With respect to natural wood (also tested on the higher stiffness direction, along the grain), AW has a 23-38% lower modulus than pine and oak, while poplar and walnut have notably higher moduli, in the order of 10 and 20 GPa respectively. The bending strength of AW is 30% higher than PS, 76% higher LOPE, and 13% lower than PP. The corresponding strength of natural woods is significantly higher than AW, with values ranging between 100-160 MPa.

Figure 18:
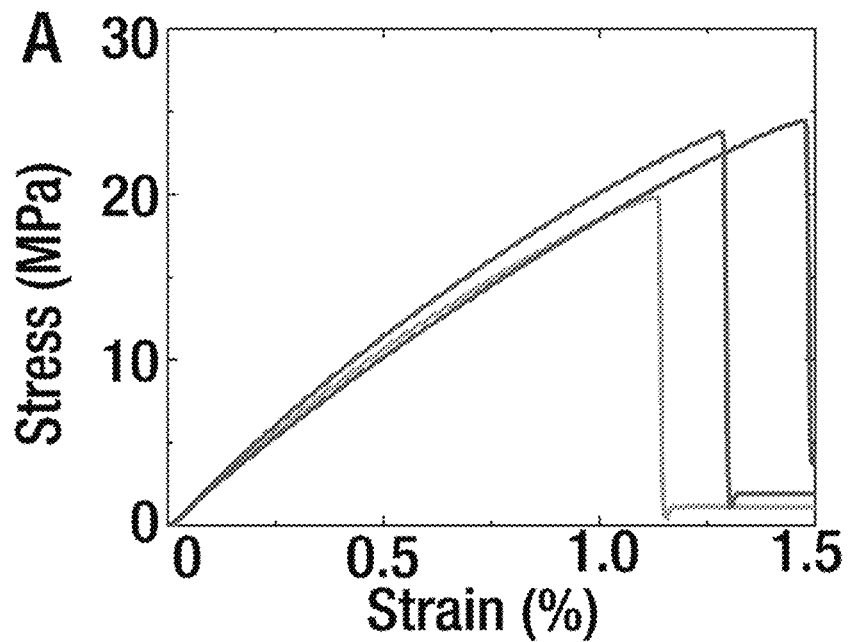
FIG. 18 shows stress-strain curves obtained from exemplary biocomposite samples in tension experiments, each curve corresponding to a sample.
Figure 19:
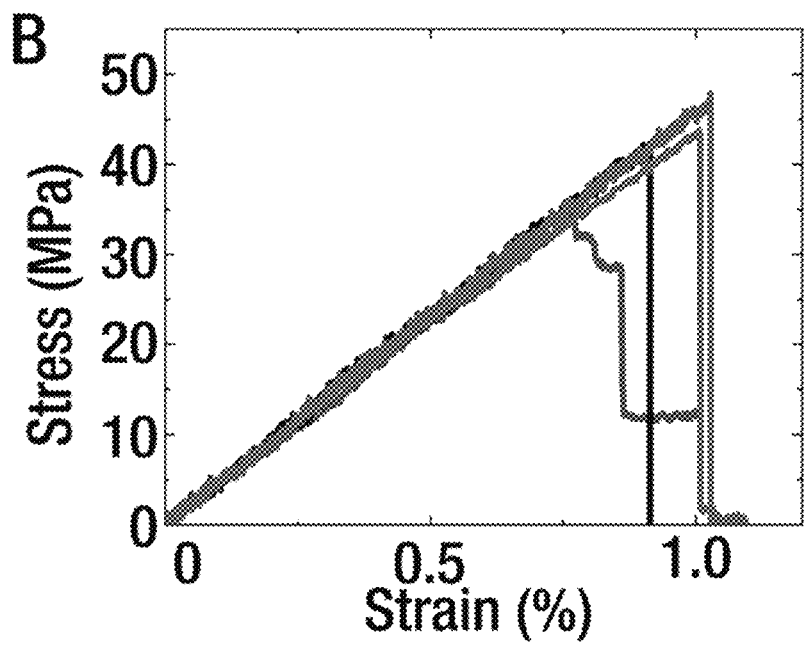
FIG. 19 shows stress-strain curves obtained from exemplary biocomposite samples in 3-point bending experiments, each curve corresponding to a sample.

Stress-strain plots obtained from the biocomposites (FIGS. 18-19), show an initial linear elastic response upon loading, both under tension and bending, followed by a brittle failure at small strains (1±0.3%).

The Young's modulus, calculated from the initial linear elastic part of the tension experiments, is 2.5±0.4 GPa, and the ultimate strength is 21.2±3 MPa. The flexural modulus is 4.2±0.4 GPa, and the modulus of rupture is 49.3±3.2 MPa.

Testing the flexural properties of the biocomposite on the two perpendicular planes (see schematic in FIG. 20), reveals that stiffness varies by a factor of ca. 1.75 in the two directions, while strength remains unaffected by orientation. The measured difference in stiffness is due to the anisotropic micro-structure of the biocomposite, resulting from the fabrication process which orients the cells normal to the compression direction.

Example 11: Preparation of Biocomposite Including Fillers

Biocomposite materials comprising additives was provided by performing a process in accordance with the approach exemplified in Example 3, modified to additives were added.

In particular, a cultured biomass was extracted from a culture according to Example 1 in a hydrated state (water content 10 wt % or higher).

The biomass was then mixed with other materials mixtures will be prepare in this step. Mixing either manual or with assistive equipment (including stirrer, ultrasonication) are used to homogenize the mixture.

Example 12: Properties Biocomposite Material Including Filler Additives

Mechanical properties of biocomposite materials prepared according to the methods exemplified in Example 11 were tested with techniques described in the materials and methods. The related results are reported in FIG. 21 and FIG. 22.

In general use the natural biopolymer mixture as a matrix and incorporate filler additives, can be performed to (i) introduce new properties/functions in the composites, and (ii) enable further tuning of the mechanical performance.

Figure 21:
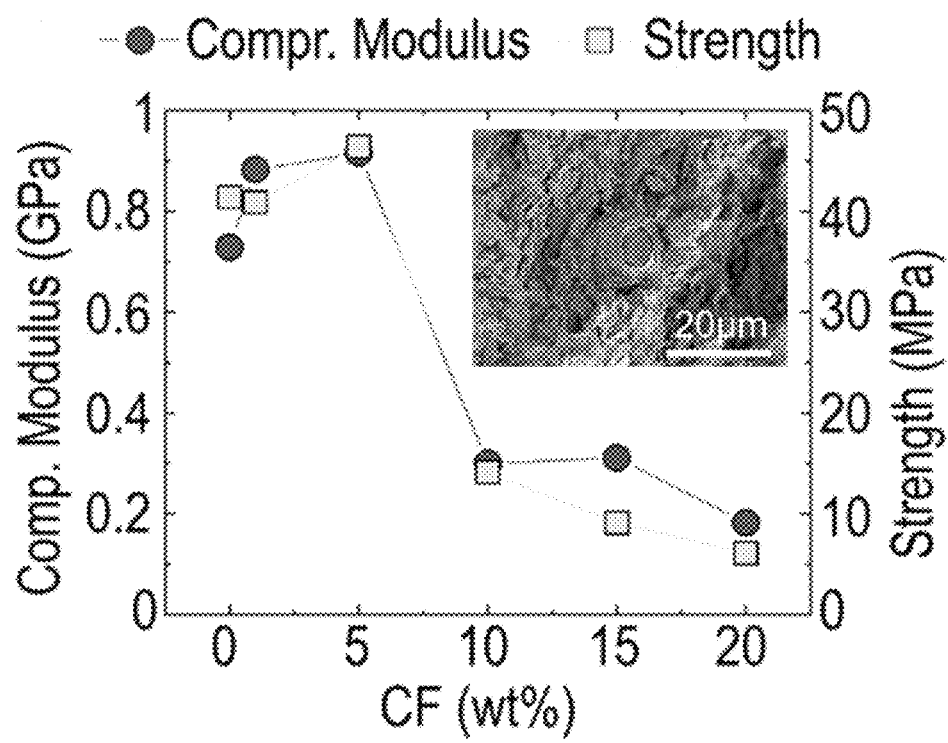
FIG. 21 shows compressive modulus and strength of biocomposites with CF. Inset: SEM image of the biocomposite with 1 wt % CF (grey scale) in which a cross section of a CF is visible in the center of the inset.

The addition of different amounts of carbon fibers (CF), for example, changes the biocomposites' compressive modulus and strength (FIG. 21). For CF concentrations below 5 wt % there is a gradual improvement of elastic modulus and strength, in the order of 20-25%, followed by a decrease for higher concentrations, as observed in polymer composites because of fillers' aggregation (38).

Similarly, there is a small strength enhancement of about 12% at 5 wt % of carbon fibers, followed by a monotonic decrease at higher filler loadings. This is a behavior typically observed in polymer composite materials, in which at low filler concentrations a more efficient filler dispersion can be obtained, thereby enabling successful load transfer between the two components. In contrast, at higher concentrations, the filler particles aggregate, thus contributing to an inhomogeneous stress distribution upon loading which leads to overall inferior mechanical performance (Roumeli et al., 2014).

Figure 22:
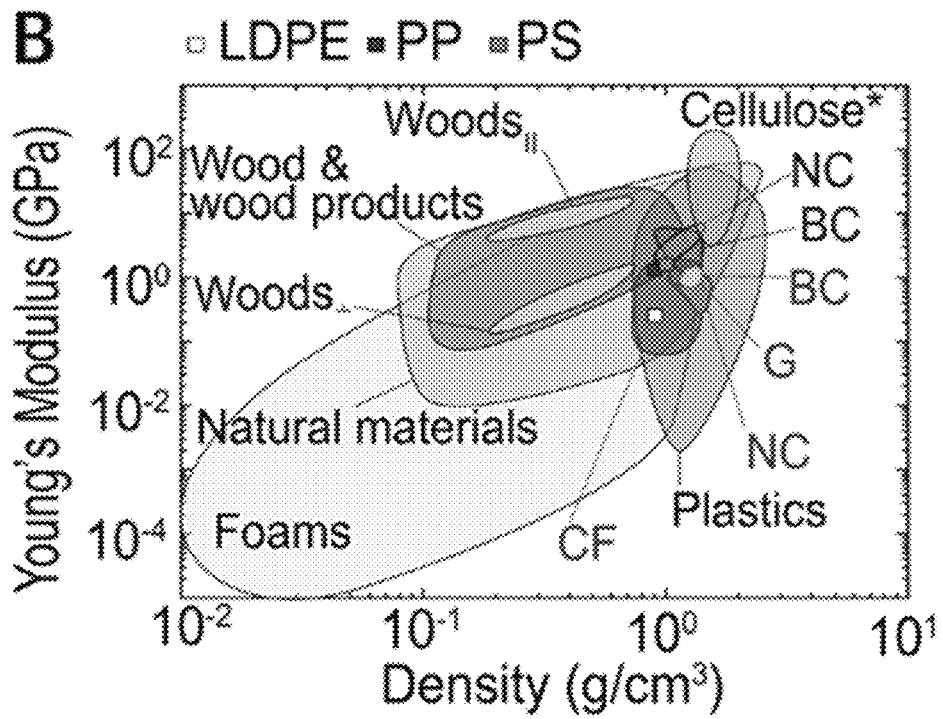
FIG. 22 shows Young's modulus versus density for various materials and biocomposites described herein. Upper annotation NC and upper annotation BC groups correspond to bending experiments, lower annotation BC, G, lower annotation NC and CF groups to compression. The cellulose* area corresponds to pure cellulose fibers, papers and nanocellulose-based products, including bacterial cellulose (26, 39, 40).

Different filler particles expand the biocomposites' property space (FIG. 22). Elastic modulus as a function of density of different plant-based biocomposites are plotted in illustrations showing pure cell matrix (BC), biocomposites containing various amounts of CF, halloysite and montmorillonite nanoclays (NC) and graphene (G). Their properties lie at the intersection of natural cellular materials, including "wood products", and commercial plastics (FIG. 22), presenting elastic moduli spanning over one order of magnitude.

Figure 23:
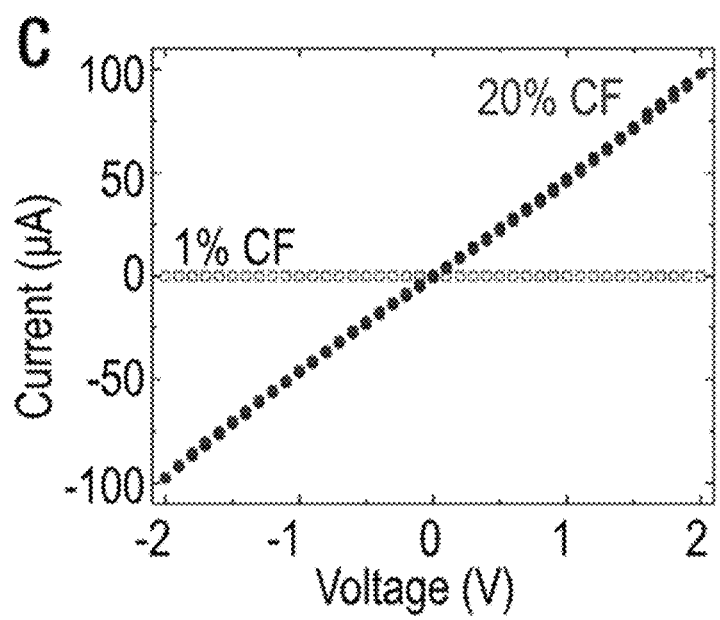
FIG. 23 shows IV curves for biocomposites with 1 wt % and 20 wt % CF.

Filler additives also endow new functionalities, such as electrical conductivity or magnetic properties. The electrical conductivity of plant cell/CF composites, for example, can be tuned varying the CF content (FIG. 23), in which the IV plots of AW containing 1 and 20 wt % of CF illustrate the effective tuning of electrical conductivity from $2.25 \times 10^{-7}$ S/m to $2.2 \times 10^{-3}$ S/m.

Figure 24:
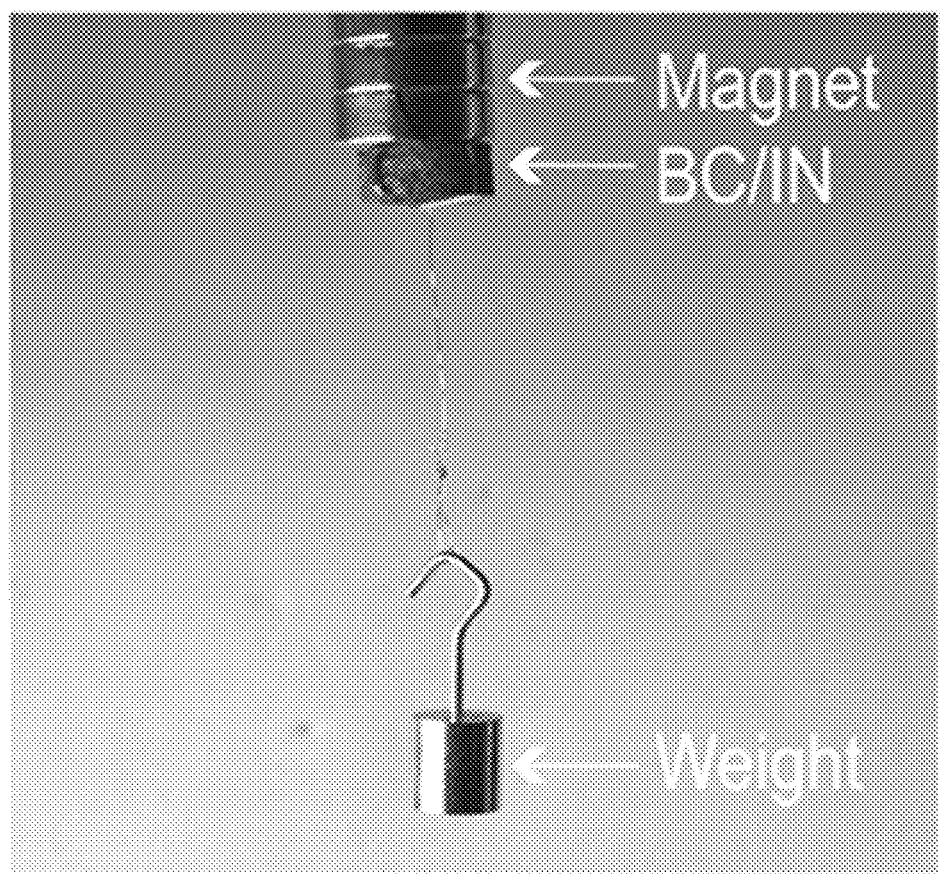
FIG. 24 shows biocomposite with IN exhibiting magnetic properties.
Figure 25:
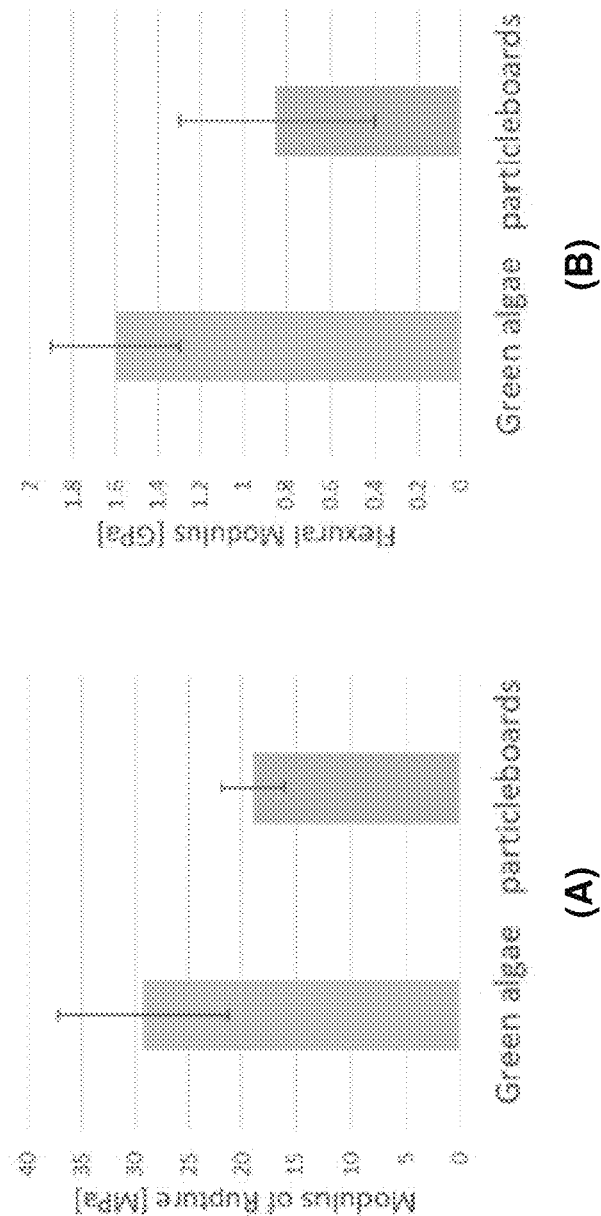
FIG. 25 shows comparison of the Modulus of Rupture in panel (B) and Flexural Modulus in panel (A) for a biocomposite produced from microalgae (*Chlamydomonas reinhartii*), labelled "green algae", obtained in the presented fabrication method and the same quantities measured in commercially available particle boards.

Similarly, the addition of 13.5 wt % iron oxide nanoparticles (IN) in the plant cell matrix conveys ferro-magnetic properties, which allow the biocomposite to support more than five times, or six times its weight when attracted by a magnet (FIG. 24).

Biocomposites have the potential to fulfill increasing global material demands from renewable resources and with reduced lifecycle environmental impacts (1, 2). Greener biocomposites with higher biological content, primarily derived from crops and plant fibers, are continuously emerging (3, 4). However, most solutions rely on petrochemicals-based matrixes or binders, or depend on harsh thermal, mechanical and chemical treatment of mature plants (2).

Most recently, self-growing biocomposites have been proposed as a new class of multi-functional materials, which capitalize on the innate ability of living matter to self-fabricate and replicate (5, 6). Bacteria have been used as a fabrication platform for cellulose (6, 7) and polyesters (8) to provide alternative materials to petroleum-based plastics. More complex living organisms, such as fungi and fermenting yeast have been used in biocomposites (9-11). Remarkably, mycelium materials already reached the market for protective packaging, insulation, and acoustic panels (9, 12-14). However, the main drawback of biocomposites that utilize eukaryotic biological growth for biomass production is that they have low mechanical performance (9, 15), which renders them unsuitable for many engineering and structural applications.

Example 13: Water Uptake-Test of Biocomposite Materials

Water uptake and thickness swelling tests were performed on biocomposites prepared according to the procedures exemplified in Example 3 and Example 11, to dry biocomposite samples (see materials and methods above).

A water uptake of 191±53% (quantified in weight % gain) were measured after 2 hours of immersion. Similarly, the thickness swelling after 2 hours is 173±48% (quantified in volume % increase). In this timeframe, the water sensitivity of biocomposites as described herein is similar to other wood-based composite materials (15). The results demonstrate that the adhesion between the mechanically compressed cells is poor. No chemical treatments were used in this experiment to initiate bonding between neighboring cells. When used in wet or humid environments, it is contemplated that surface treatments or coating of the biocomposites could be employed to mitigate water infiltration and damage.

Additional tests on water absorption and thickness swelling were conducted to dry AW samples, and a water uptake of 260±15% was measured after 2 hours of immersion and 415±80% after 24 hours. Similarly, the thickness swelling after 2 h is 225±15%, and after 24 hours it is 345±20%. The results demonstrate that the adhesion between the mechanically compressed cells can be enhanced by chemical treatment to initiate any type of bonding between neighboring cells other than physical attraction (Sun et al., 2019).

Water uptake and thickness swelling tests indicated that biocomposites as described herein respond similarly to other wood-based materials (15). In applications, the water uptake is mitigated with surface treatments or water-resistant coatings.

Experiments performed with biocomposite fabricated as indicated in this example with fillers resulted in comparable results.

In summary described herein are biocomposites and related compositions, fabrication methods and systems the biocomposites comprising compacted plants and/or algae cells having a water content of less than 15 wt %, and a minimized pore presence and/or dimensions, in which the compacted cells are in a lamellar stacked configuration with a plurality of lamellae arranged one above the other, each lamella independently having a thickness of 20 nm to 5 µm and comprising a semi-crystalline structure formed by biopolymers of cell walls of the compacted plant and/or algae cells.

The examples set forth above are provided to give those of ordinary skill in the art a complete disclosure and description of how to make and use the embodiments of the binding compounds, compositions, devices, methods and systems for the selective detection, and are not intended to limit the scope of what the Applicants regard as their disclosure. Modifications of the above-described modes for carrying out the disclosure can be used by persons of skill in the art and are intended to be within the scope of the following claims.

The entire disclosure of each document cited (including patents, patent applications, journal articles including related supplemental and/or supporting information sections, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed. Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

When a Markush group or other grouping is used herein, all individual members of the group and all combinations and possible sub-combinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure.

Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations, which is not specifically disclosed herein.

"Optional" or "optionally" means that the subsequently described circumstance can or cannot occur, so that the description includes instances where the circumstance occurs and instances where it does not according to the guidance provided in the present disclosure. Combinations envisioned can be identified in view of the desired features of the device in view of the present disclosure, and in view of the features that result in the formation.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

In particular, it will be understood that various modifications may be made without departing from the spirit and scope of the present disclosure. Accordingly, other embodiments are within the scope of the following claim.

REFERENCES

1. A. K. Mohanty, M. Misra, G. Hinrichsen, Biofibres, biodegradable polymers and biocomposites: An overview. *Macromol. Mater. Eng.* 276, 1-24 (2000).
2. A. K. Mohanty, S. Vivekanandhan, J.-M. Pin, M. Misra, Composites from renewable andsustainable resources: Challenges and innovations. *Science* (80). 362, 536-542 (2018).
3. A. K. Mohanty, M. Misra, L. T. Drzal, *Natural Fibers, Biopolymers, and Biocomposites* (CRC Press, 2005).
4. O. Faruk, A. K. Bledzki, H. P. Fink, M. Sain, Biocomposites reinforced with natural fibers: 2000-2010. *Prog. Polym. Sci.* 37, 1552-1596 (2012).
5. P. Q. Nguyen, N. M. D. Courchesne, A. Duraj-Thatte, P. Praveschotinunt, N. S. Joshi, Engineered Living Materials: Prospects and Challenges for Using Biological Systems to Direct the Assembly of Smart Materials. *Adv. Mater.* 30, 1704847 (2018).
6. M. Schaffner, P. A. Rühs, F. Coulter, S. Kilcher, A. R. Studart, 3D printing of bacteria into functional complex materials. *Sci. Adv.* 3, eaao6804 (2017).
7. P. A. Rühs, F. Storz, Y. A. López Gómez, M. Haug, P. Fischer, 3D bacterial cellulose biofilms formed by foam templating. *npj Biofilms Microbiomes* 4, 21 (2018).
8. R. A. J. Verlinden, D. J. Hill, M. A. Kenward, C. D. Williams, I. Radecka, Bacterial synthesis of biodegradable polyhydroxyalkanoates. *J. Appl. Microbiol.* 102, 1437-1449 (2007).
9. M. Haneef, L. Ceseracciu, C. Canale, I. S. Bayer, J. A. Heredia-Guerrero, A. Athanassiou, Advanced Materials from Fungal Mycelium: Fabrication and Tuning of Physical Properties. *Sci. Rep.* 7, 41292 (2017).
10. L. Valentini, S. B. Bon, S. Signetti, M. Tripathi, E. Iacob, N. M. Pugno, Fermentation based carbon nanotube multifunctional bionic composites. *Sci. Rep.* 6, 27031 (2016).
11. N. M. Pugno, L. Valentini, Bionicomposites. *Nanoscale.* 11, 3326-3335 (2019).
12. M. Jones, T. Bhat, E. Kandare, A. Thomas, P. Joseph, C. Dekiwadia, R. Yuen, S. John, J. Ma, C. Wang, Thermal Degradation and Fire Properties of Fungal Mycelium and Mycelium—Biomass Composite Materials. *Sci. Rep.* 8, 17583 (2018).
13. E. Karana, D. Blauwhoff, E. J. Hultink, S. Camere, When the material grows: A case study on designing (with) mycelium-based materials. *Int. J. Des.* 12, 119-136 (2018).
14. K. Cerimi, K. C. Akkaya, C. Pohl, B. Schmidt, P. Neubauer, Fungi as source for new bio-based materials: a patent review. *Fungal Biol. Biotechnol.* 6, 17 (2019).
15. W. Sun, M. Tajvidi, C. G. Hunt, G. McIntyre, D. J. Gardner, Fully Bio-Based Hybrid Composites Made of Wood, Fungal Mycelium and Cellulose Nanofibrils. *Sci. Rep.* 9, 3766 (2019).
16. L. J. Gibson, The hierarchical structure and mechanics of plant materials. *J R Soc Interface.* 9, 2749-2766 (2012).
17. J. Song, C. Chen, S. Zhu, M. Zhu, J. Dai, U. Ray, Y. Li, Y. Kuang, Y. Li, N. Quispe, Y. Yao, A. Gong, U. H. Leiste, H. A. Bruck, J. Y. Zhu, A. Vellore, H. Li, M. L. Minus, Z. Jia, A. Martini, T. Li, L. Hu, Processing bulk natural wood into a high-performance structural material. *Nature.* 554, 224-228 (2018).
18. L. A. Berglund, I. Burgert, Bioinspired Wood Nanotechnology for Functional Materials. *Adv. Mater.* 30, 1704285 (2018).
19. F. Jiang, T. Li, Y. Li, Y. Zhang, A. Gong, J. Dai, E. Hitz, W. Luo, L. Hu, Wood-Based Nanotechnologies toward Sustainability. *Adv. Mater.* 4, 1703453 (2018).
20. T. Li, J. Song, X. Zhao, Z. Yang, G. Pastel, S. Xu, C. Jia, J. Dai, C. Chen, A. Gong, F. Jiang, Y. Yao, T. Fan, B. Yang, L. Wagberg, R. Yang, L. Hu, Anisotropic, lightweight, strong, and super thermally insulating nanowood with naturally aligned nanocellulose. *Sci. Adv.* 4, eaar3724 (2018).
21. L. Berglund, M. Noël, Y. Aitomäki, T. Öman, K. Oksman, Production potential of cellulose nanofibers from industrial residues: Efficiency and nanofiber characteristics. *Ind. Crops Prod.* 92, 84-92 (2016).
22. T. Nagata, Y. Nemoto, S. Hasezawa, Tobacco BY-2 Cell Line as the "HeLa" Cell in the Cell Biology of Higher Plants. *Int. Rev. Cytol.* 132, 1-30 (1992).
23. N. Gierlinger, T. Keplinger, M. Harrington, Imaging of plant cell walls by confocal Raman microscopy. *Nat. Protoc.* 7, 1694-1708 (2012).
24. E. E. Väisänen, A. I. Smeds, K. V. Fagerstedt, T. H. Teeri, S. M. Willför, A. Kärkönen, Coniferyl alcohol hinders the growth of tobacco BY-2 cells and *Nicotiana benthamiana* seedlings. *Planta.* 242, 747-760 (2015).
25. J. H. Wiley, R. H. Atalla, Band assignments in the raman spectra of celluloses. *Carbohydr. Res.* 160, 113-129 (1987).

26. R. J. Moon, A. Martini, J. Nairn, J. Youngblood, A. Martini, J. Nairn, J. Simonsen, J. Youngblood, Cellulose nanomaterials review: structure, properties and nanocomposites. *Chem. Soc. Rev.* 40, 3941-3994 (2011).
27. R. Arévalo, T. Peijs, Binderless all-cellulose fibreboard from microfibrillated lignocellulosic natural fibres. *Compos. Part A Appl. Sci. Manuf.* 83, 38-46 (2016).
28. A. Meng, S. Chen, H. Zhou, Y. Long, Y. Zhang, Q. Li, Pyrolysis and simulation of typical components in wastes with macro-TGA. *Fuel.* 157, 1-8 (2015).
29. J. Li, J. Xu, L. Mo, J. Gong, Z. Xiang, Research on cellulose nanocrystals produced from cellulose sources with various polymorphs. *RSC Adv.* 7, 33486-33493 (2017).
30. D. J. Cosgrove, Plant cell wall extensibility: Connecting plant cell growth with cell wall structure, mechanics, and the action of wall-modifying enzymes. *J. Exp. Bot.* 67, 463-476 (2016).
31. L. Valentini, S. Bittolo Bon, N. M. Pugno, Graphene and Carbon Nanotube Auxetic Rubber Bionic Composites with Negative Variation of the Electrical Resistance and Comparison with Their Nonbionic Counterparts. *Adv. Funct. Mater.* 27, 1606526 (2017).
32. R. Di Giacomo, C. Daraio, B. Maresca, Plant nanobionic materials with a giant temperature response mediated by pectin-Ca2+. *Proc. Natl. Acad. Sci. U.S.A.* 112, 4541-4545 (2015).
33. R. Di Giacomo, B. Maresca, M. Angelillo, G. Landi, A. Leone, M. C. Vaccaro, C. Boit, A. Porta, H. C. Neitzert, Bio-nano-composite materials constructed with single cells and carbon nanotubes: Mechanical, electrical, and optical properties. *IEEE Trans. Nanotechnol.* 12, 1026-1030 (2013).
34. L. Valentini, S. Bittolo Bon, S. Signetti, N. M. Pugno, Graphene-Based Bionic Composites with Multifunctional and Repairing Properties. *ACS Appl. Mater. Interfaces.* 8, 7607-7612 (2016).
35. R. Di Giacomo, B. Maresca, A. Porta, P. Sabatino, G. Carapella, H.-C. Neitzert, Candida albicans/MWCNTs: A Stable Conductive Bio-Nanocomposite and Its Temperature-Sensing Properties. *IEEE Trans. Nanotechnol.* 12, 111-114 (2013).
36. K. G. Satyanarayana, G. G. C. Arizaga, F. Wypych, Biodegradable composites based on lignocellulosic fibers—An overview. *Prog. Polym. Sci.* 34, 982-1021 (2009).
37. K. Iiyama, T. Lam, B. A. Stone, Covalent Cross-Links in the Cell Wall. *Plant Physiol.* 104, 315-320 (1994).
38. E. Roumeli, E. Pavlidou, A. Avgeropoulos, G. Vourlias, D. N. D. Bikiaris, K. Chrissafis, Factors Controlling the Enhanced Mechanical and Thermal Properties of Nano-diamond-Reinforced Cross-Linked High Density Polyethylene. *J. Phys. Chem. B.* 118, 11341-11352 (2014).
39. A. J. Benítez, A. Walther, Cellulose nanofibril nanopapers and bioinspired nanocomposites: a review to understand the mechanical property space. *J. Mater. Chem. A.* 5, 16003-16024 (2017).
40. Y. C. Hsieh, H. Yano, M. Nogi, S. J. Eichhorn, An estimation of the Young's modulus of bacterial cellulose filaments. *Cellulose.* 15, 507-513 (2008).
41. D. N. Mastronarde, Automated electron microscope tomography using robust prediction of specimen movements. *J. Struct. Biol.* 152, 36-51 (2005).
42. D. N. Mastronarde, Correction for non-perpendicularity of beam and tilt axis in tomographic reconstructions with the IMOD package. *J. Microsc.* 230, 212-217 (2008).
43. I. De Baere, W. Van Paepegem, J. Degrieck, On the design of end tabs for quasi-static and fatigue testing of fibre-reinforced composites. *Polym. Compos.* 30, 381-390 (2009).
44. H. Wang, D. Wei, A. Zheng, H. Xiao, Soil burial biodegradation of antimicrobial biodegradable PBAT films. *Polym. Degrad. Stab.* 116, 14-22 (2015).
45. M. Kačuráková, N. Wellner, A. Ebringerová, Z. Hromádková, R. Wilson, P. Belton, Characterisation of xylan-type polysaccharides and associated cell wall components by FT-IR and FT-Raman spectroscopies. *Food Hydrocoll.* 13, 35-41 (1999).
46. A. Cogulet, P. Blanchet, V. Landry, Wood degradation under UV irradiation: A lignin characterization. *J. Photochem. Photobiol. B Biol.* 158, 184-191 (2016).
47. K. Schenzel, S. Fischer, NIR FT Raman spectroscopy—A rapid analytical tool for detecting the transformation of cellulose polymorphs. *Cellulose.* 8, 49-57 (2001).
48. U. P. Agarwal, J. D. McSweeny, S. A. Ralph, FT-raman investigation of milled-wood lignins: Softwood, hardwood, and chemically modified black spruce lignins. *J. Wood Chem. Technol.* 31, 324-344 (2011).
49. R. Quesada Cabrera, F. Meersman, P. F. McMillan, V. Dmitriev, Nanomechanical and structural properties of native cellulose under compressive stress. *Biomacromolecules.* 12, 2178-2183 (2011).
50. T. T. Nge, S. H. Lee, T. Endo, Preparation of nanoscale cellulose materials with different morphologies by mechanical treatments and their characterization. *Cellulose.* 20, 1841-1852 (2013).
51. T. Gubica, A. Temeriusz, K. Paradowska, A. Ostrowski, P. Klimentowska, M. K. Cyrański, Single-crystal and powder X-ray diffraction and solid-state 13C NMR of p-nitrophenyl glycopyranosides, the derivatives of d-galactose, d-glucose, and d-mannose. *Carbohydr. Res.* 344, 1734-1744 (2009).
52. P. Sarkar, E. Bosneaga, M. Auer, Plant cell walls throughout evolution: Towards a molecular understanding of their design principles. *J. Exp. Bot.* 60, 3615-3635 (2009).
53. Y. Zeng, M. E. Himmel, S. Y. Ding, Visualizing chemical functionality in plant cell walls Mike Himmel. *Biotechnol. Biofuels.* 10, 263 (2017).
54. A. C. Balazs, T. Emrick and T. P. Russell (2006) 'Nanoparticle Polymer Composites: Where Two Small Worlds Meet', *Science,* 314(5802), pp. 1107-1110. Available at: http://www.sciencemag.org/content/314/5802/1107.abstract.
55. Bigall, N. C. et al. (2008) 'Fungal templates for noble-metal nanoparticles and their application in catalysis', *Angewandte Chemie—International Edition,* 47(41), pp. 7876-7879. doi: 10.1002/anie.200801802.
56. Cosgrove, D. J. (2005) 'Growth of the plant cell wall', *Nature Reviews Molecular Cell Biology,* 6(11), pp. 850-861. doi: 10.1038/nrm1746.
57. Cosgrove, D. J. (2014) 'Re-constructing our models of cellulose and primary cell wall assembly', *Current Opinion in Plant Biology.* Elsevier Ltd, 22, pp. 122-131. doi: 10.1016/j.pbi.2014.11.001.
58. Gasparovic, L., Korenova, z. and Jelemensky, I. (2010) 'Kinetic study of wood chips decomposition by TGA', *Chemical Papers,* 64(2), pp. 174-181. doi: 10.2478/s11696-009-0109-4.
59. Gibson, L. J. and Ashby, M. F. (1997) *Cellular Solids.* Cambridge: Cambridge University Press. doi: 10.1017/CBO9781139878326.

60. Hafren, J., Fujino, T. and Itoh, T. (1999) 'Changes in cell wall architecture of differentiating tracheids of *Pinus thunbergii* during lignification', *Plant and Cell Physiology*, 40(5), pp. 532-541. doi: 10.1093/oxfordjournals.pcp.a029574.
61. Huang, V. et al. (2019) 'Conductive Polymer Composites from Renewable Resources: An Overview of Preparation, Properties, and Applications', *Polymers*, 11(2), p. 187. doi: 10.3390/polym11020187.
62. Kinloch, I. A. et al. (2018) 'Composites with carbon nanotubes and graphene: An outlook', Science, 362 (6414), pp. 547-553. doi: 10.1126/science.aat7439.
63. Lv, S. et al. (2017) 'Biodegradation behavior and modelling of soil burial effect on degradation rate of PLA blended with starch and wood flour', Colloids and Surfaces B: Biointerfaces. Elsevier B.V., 159, pp. 800-808. doi: 10.1016/j.colsurfb.2017.08.056.
64. Mccann, M. C., Wells, B. and Roberts, K. (1990) Direct visualization of cross-links in the primary plant cell wall.
65. Mendu, V. et al. (2011) 'Identification and thermochemical analysis of high-lignin feedstocks for biofuel and biochemical production', Biotechnology for Biofuels, 4(October). doi: 10.1186/1754-6834-4-43.
66. Okubo-Kurihara, E. et al. (2016) 'Modification of plant cell wall structure accompanied by enhancement of saccharification efficiency using a chemical, lasalocid sodium', Scientific Reports, 6(1), p. 34602. doi: 10.1038/srep34602.
67. Pugno, N. M. and Valentini, L. (2019) 'Bionicomposites', Nanoscale, 11(7), pp. 3102-3111. doi: 10.1039/C8NR08569B.
68. Turku, I. et al. (2017) 'Characterization of wood plastic composites manufactured from recycled plastic blends', Composite Structures, 161, pp. 469-476. doi: 10.1016/j.compstruct.2016.11.073.
69. Zhang, T., Zheng, Y. and Cosgrove, D. J. (2016) 'Spatial organization of cellulose microfibrils and matrix polysaccharides in primary plant cell walls as imaged by multichannel atomic force microscopy', Plant Journal. doi: 10.1111/tpj.13102.
70. Zhu, H. et al. (2016) 'Wood-Derived Materials for Green Electronics, Biological Devices, and Energy Applications', Chemical Reviews, 116(16), pp. 9305-9374. doi: 10.1021/acs.chemrev.6b00225.
71. H. Herzog, D. Golomb, Encyclopedia of Energy 1: 1-11 (2004)
72. Kock-Yee Law, "Definitions for Hydrophilicity, Hydrophobicity, and Superhydrophobicity: Getting the Basics Right," J. Phys. Chem. Lett. 2014, 5, 686-688
73. Hyun-Ju Hwang, Yong Tae Kim, Nam Seon Kang, Jong Won Han A Simple Method for Removal of the *Chlamydomonas Reinhardtii* Cell Wall Using a Commercially Available Subtilisin (Alcalase) J Mol Microbiol Biotechnol. 2018; 28(4):169-178. And
74. JurgenVoigt DagmarWrann Hans-PeterVogeler Wilfried A. König Marianne Mix Hydroxyproline-containing and glycine-rich cell wall polypeptides are widespread in the green algae Microbiological Research, Volume 149, Issue 3, September 1994, Pages 223-229
75. Paul-Hubert Baudelet [a]GuillaumeRicochon [b]MichelLinder[a] LionelMuniglia A new insight into cell walls of Chlorophyta Algal Research Volume 25, July 2017, Pages 333-371
76. Viridiplantae and Algae. Malcolm A. O'Neill, Alan G. Darvill, Marilynn E. Etzler, Debra Mohnen, and Serge Perez 2015-2017 by The Consortium of Glycobiology Editors, La Jolla, California.

The invention claimed is:

1. A biocomposite material fabrication method, comprising:
compacting along a plane a cultured biomass comprising cultured plant and/or algae cells from a suspension culture, the cultured plant and/or algae cells having a water content of at least 10 wt %, and a turgor pressure,
the compacting performed by continuously applying to the cultured biomass an increasing pressure perpendicular to the plane until reaching an applied pressure corresponding to the turgor pressure of the cultured plant and/or algae cells to provide a compacted biomass;
the method further comprising
drying the compacted biomass by
a) applying a drying pressure to the compacted biomass, and/or
b) applying a drying temperature to the compacted biomass,
to obtain a biocomposite material having a water content from 0.1 to less than 15 wt %, a mass loss from the cultured biomass of 80-99 wt %, and/or a dry density of 500-1500 kg/m$^3$.

2. The biocomposite material fabrication method of claim 1, wherein the cultured biomass has a water content of at least 60 wt %.

3. The biocomposite material fabrication method of claim 1, wherein the increasing pressure comprises a start pressure of 5% to 15% of the turgor pressure.

4. The biocomposite material fabrication method of claim 1, wherein the increasing pressure is a linearly increasing pressure from 0.1 MPa to 0.8 MPa to 1 MPa.

5. The biocomposite material fabrication method of claim 1, wherein the continuously applying to the cultured biomass is performed from 6 to 8 days.

6. The biocomposite material fabrication method of claim 1, wherein the compacted biomass has a water content of at least 50 wt %.

7. The biocomposite material fabrication method of claim 1, wherein the drying pressure is the applied pressure corresponding to the turgor pressure, or a pressure up to 2 or 3 times of applied pressure corresponding to the turgor pressure.

8. The biocomposite material fabrication method of claim 1, wherein the drying temperature ranges from 20° C. to 100° C.

9. The biocomposite material fabrication method of claim 1, further comprising mixing at least one additive to the cultured biomass before the compacting.

10. The biocomposite material fabrication method of claim 1, further comprising providing the cultured biomass by preparing a suspension culture from cells from feedstock biomass comprising agricultural waste and/or agricultural residue, algae, dedicated energy crop, forestry residue, waste stream and/or re-useable carbon biosource.

11. The biocomposite material fabrication method of claim 1, wherein continuously applying to the cultured biomass an increasing pressure is performed by increasing the pressure linearly to minimize pores formation and diameter.

12. The biocomposite material fabrication method of claim 1, wherein continuously applying to the cultured biomass an increasing pressure is performed at a constant rate ranging from 0.01 to 0.5 MPa/day.

13. The biocomposite material fabrication method of claim 1, wherein continuously applying to the cultured biomass an increasing pressure is performed by applying an increasing pressure ranging from 0.5 to 1.5 MPa.

14. The biocomposite material fabrication method of claim 1, wherein drying the compacted biomass can be performed without applying a drying temperature and wherein the compacted biomass is compacted at a varying pressure to control their dehydration over time.

15. The biocomposite material fabrication method of claim 14, wherein drying the compacted biomass is performed by applying a drying pressure to the compacted biomass without applying a drying temperature for up to 2 months.

16. The biocomposite material fabrication method of claim 1, wherein the drying pressure is higher than the applied pressure corresponding to the turgor pressure of the cultured plant and/or algae cells.

17. The biocomposite material fabrication method of claim 1, wherein the drying pressure is up to 5Mpa.

18. The biocomposite material fabrication method of claim 1, wherein the drying pressure is applied linearly and continuously.

19. The biocomposite material fabrication method of claim 1, wherein the drying the compacted biomass comprises applying a drying temperature.

20. The biocomposite material fabrication method of claim 1, wherein the drying temperature is a temperature up to 60° C.

21. The biocomposite material fabrication method of claim 1, wherein drying the compacted biomass is performed for a drying time ranging from 24 to 72 hours.

22. The biocomposite material fabrication method of claim 1, wherein drying the compacted biomass is performed for 2 to 48 hours at a temperature ranging from 40° C. to 85° C.

23. The biocomposite material fabrication method of claim 1, wherein drying the compacted biomass is performed to obtain a biocomposite material having a water content equal to or less than 12 wt %.

24. The biocomposite material fabrication method of claim 1, wherein drying the compacted biomass is performed to obtain a biocomposite material having pores with a diameter of less than 10 µm.

25. The biocomposite material fabrication method of claim 1, wherein drying the compacted biomass is performed to obtain a biocomposite material in which compacted plant and/or algae cells form lamellae having a thickness of 20 nm to 5 µm.

26. The biocomposite material fabrication method of claim 1, wherein the method further comprises drying the cultured biomass before the compacting.

27. The biocomposite material fabrication method of claim 1, wherein drying the compacted biomass is performed for 2 to 48 hours at a 60° C. temperature.

* * * * *